(12) United States Patent
Duan et al.

(10) Patent No.: US 11,095,425 B2
(45) Date of Patent: Aug. 17, 2021

(54) SMALL LOOP DELAY CLOCK AND DATA RECOVERY BLOCK FOR HIGH-SPEED NEXT GENERATION C-PHY

(71) Applicant: QUALCOMM Incorporated, San Diego, CA (US)

(72) Inventors: Ying Duan, San Diego, CA (US); Jing Wu, San Diego, CA (US); Shih-Wei Chou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/001,801

(22) Filed: Aug. 25, 2020

(65) Prior Publication Data

US 2021/0126765 A1    Apr. 29, 2021

Related U.S. Application Data

(60) Provisional application No. 62/925,916, filed on Oct. 25, 2019.

(51) Int. Cl.
*H04B 3/00*    (2006.01)
*H04L 25/00*   (2006.01)
*H04L 7/00*    (2006.01)

(52) U.S. Cl.
CPC ................................ *H04L 7/0037* (2013.01)

(58) Field of Classification Search
CPC . H04L 7/0037; H04L 7/0012; H04L 25/4917; H04L 7/033; H04L 7/027; H04L 7/0331; H04L 5/20; H04L 25/14; H03K 5/135; G06F 13/4295

USPC ........ 375/257, 258, 222, 260, 326, 324, 355
See application file for complete search history.

(56) References Cited

U.S. PATENT DOCUMENTS

| | | | | |
|---|---|---|---|---|
| 9,246,666 | B2 * | 1/2016 | Kil | .................. H04L 7/0331 |
| 9,363,071 | B2 * | 6/2016 | Sengoku | ................. H04L 7/027 |
| 9,485,080 | B1 | 11/2016 | Duan et al. | |
| 9,496,879 | B1 * | 11/2016 | Duan | ................... H04L 7/0037 |
| 9,735,950 | B1 | 8/2017 | Liu et al. | |
| 9,948,485 | B2 * | 4/2018 | Wiley | ....................... H04L 5/20 |
| 10,033,519 | B2 * | 7/2018 | Duan | .................... H04L 7/0012 |

(Continued)

OTHER PUBLICATIONS

International Search Report and Written Opinion—PCT/US2020/047919—ISA/EPO—dated Dec. 8, 2020.

(Continued)

*Primary Examiner* — Phuong Phu

(74) *Attorney, Agent, or Firm* — Chui-kiu Teresa Wong

(57) ABSTRACT

Methods, apparatus, and systems for communication over a multi-wire, multi-phase interface are disclosed. A clock recovery method includes generating a combination signal that includes transition pulses, each transition pulse being generated responsive to a transition in a difference signal representative of a difference in signaling state of a pair of wires in a three-wire bus. The combination signal is provided to a logic circuit that is configured to provide a clock signal as its output, where pulses in the combination signal cause the clock signal to be driven to a first state. The logic circuit receives a reset signal that is derived from the clock signal by delaying transitions to the first state while passing transitions from the first state without added delay. The clock signal is driven from the first state after passing a transition of the clock signal to the first state.

29 Claims, 21 Drawing Sheets

(56) References Cited

U.S. PATENT DOCUMENTS

| | | | |
|---|---|---|---|
| 10,284,360 B2 | 5/2019 | Choi et al. | |
| 10,298,381 B1 | 5/2019 | Lee et al. | |
| 10,333,690 B1* | 6/2019 | Duan | H04L 7/0037 |
| 10,419,246 B2* | 9/2019 | Duan | H03K 5/135 |
| 10,437,744 B2* | 10/2019 | Song | G06F 13/4295 |
| 10,742,390 B2* | 8/2020 | Liao | H04L 25/4917 |
| 2004/0141567 A1 | 7/2004 | Yang et al. | |
| 2006/0181320 A1 | 8/2006 | Dreps et al. | |
| 2014/0348214 A1* | 11/2014 | Sengoku | H04L 7/033 375/147 |
| 2015/0030112 A1* | 1/2015 | Wiley | H04L 7/0337 375/360 |
| 2017/0264379 A1* | 9/2017 | Wiley | H04L 25/14 |

OTHER PUBLICATIONS

Kim H., et al.,"A Novel Clock Recovery Scheme with Improved Jitter Tolerance for PAM4 Signaling", System-On-Chip for Real-Time Applications, 2005. Proceedings. Fifth in Ternational Workshop on BANFF, AB, Canada Jul. 20-24, 2005, Piscataway, NJ, USA,IEEE, Jul. 20, 2005 (Jul. 20, 2005), pp. 101-106, XP010851924, 6 Pages, DOI: 10.1109/IWSOC.2005.19 ISBN: 978-0-7695-2403-0 figure 2.

* cited by examiner

US 11,095,425 B2

SMALL LOOP DELAY CLOCK AND DATA RECOVERY BLOCK FOR HIGH-SPEED NEXT GENERATION C-PHY

PRIORITY

This application claims priority to and the benefit of U.S. Provisional Patent Application Ser. No. 62/925,916 filed in the U.S. Patent Office on Oct. 25, 2019, the entire content of this application being incorporated herein by reference as if fully set forth below in its entirety and for all applicable purposes.

TECHNICAL FIELD

The present disclosure relates generally to high-speed data communication interfaces, and more particularly, to clock generation in a receiver coupled to a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

The C-PHY interface is a multiphase three-wire interface defined by the MIPI Alliance that uses a trio of conductors to transmit information between devices. Each wire in the trio may be in one of three signaling states during transmission of a symbol. Clock information is encoded in the sequence of transmitted symbols and a receiver generates a clock signal from transitions between consecutive symbols. The ability of a clock and data recovery (CDR) circuit to recover clock information may be limited by the maximum time variation related to transitions of signals transmitted on the different wires of the communication link. The CDR circuit in a C-PHY receiver may employ a feedback loop to control circuits that generate pulses in a receive clock signal. The feedback loop may be used to ensure that pulse generating circuits do not generate additional pulses triggered by transients that can occur before the conductors in the trio have assumed a stable signaling state before providing a sampling edge. Maximum symbol transmission rate may be limited by the feedback loop, and there is an ongoing need for optimized clock generation circuits that can function reliably at ever-higher signaling frequencies.

SUMMARY

Embodiments disclosed herein provide systems, methods and apparatus that enable improved communication on a multi-wire and/or multiphase communication link. The communication link may be deployed in apparatus such as a mobile terminal having multiple Integrated Circuit (IC) devices.

In various aspects of the disclosure, a clock recovery apparatus has a plurality of pulse generating circuits, a first logic circuit, a second logic circuit and an asymmetric delay circuit. Each pulse generating circuit is configured to generate a transition pulse in response to a transition in a difference signal representative of a difference in signaling state of a pair of wires in a three-wire bus. The first logic circuit is configured to provide a combination signal that includes pulses that correspond to transition pulses received from the plurality of pulse generating circuits. The second logic circuit is responsive to pulses in the combination signal and is configured to output a clock signal used for decoding information from transitions in signaling state of the three-wire bus. The pulses in the combination signal cause the clock signal to be driven to a first state. The asymmetric delay circuit configured to generate a reset signal from the clock signal. The reset signal may be generated by delaying transitions to the first state while passing transitions from the first state without added delay, and the clock signal may be driven from the first state when the reset signal transitions to the first state.

In certain aspects, each of the plurality of pulse generating circuits includes an exclusive OR-gate configured to receive the associated difference signal and a delayed version of the associated difference signal as inputs. The first logic circuit may include a logic gate configured to provide the combination signal by combining output signals received from the exclusive OR-gate of each pulse generating circuit. Each of the plurality of pulse generating circuits may be configured to generate pulses with a duration configured based on a minimum clock pulse duration defined for the second logic circuit. The duration of pulses generated by the delay circuit in each of the plurality of pulse generating circuits may be configurable. The duration of a delay applied by the asymmetric delay circuit to transitions to the first state may be configurable.

In one aspect, the asymmetric delay circuit is a rising-edge delay circuit configured to delay transitions from a low logic state to a high logic state. The rising-edge delay circuit may be configured to pass transitions from the high logic state to the low logic state without added delay. In one aspect, a wire state decoder is configured to decode symbols from transitions in signaling state of the three-wire bus based on timing information provided in the clock signal.

In various aspects of the disclosure, a clock recovery method includes generating a combination signal that includes pulses that correspond to transition pulses generated in response to a transition in a difference signal representative of a difference in signaling state of a pair of wires in a three-wire bus. The clock recovery method further includes providing the combination signal to a logic circuit that is configured to provide a clock signal as its output, where pulses in the combination signal cause the clock signal to be driven to a first state. The clock recovery method further includes providing a reset signal to the logic circuit, where the reset signal is derived from the clock signal by delaying transitions to the first state while passing transitions from the first state without added delay. The clock signal is driven from the first state after passing a transition of the clock signal to the first state.

In various aspects of the disclosure, a processor-readable storage medium has one or more instructions which, when executed by at least one processor of a processing circuit in a receiver, cause the at least one processor to generate a combination signal that includes pulses that correspond to transition pulses generated in response to a transition in a difference signal representative of a difference in signaling state of a pair of wires in a three-wire bus. The instructions cause the at least one processor to provide the combination signal to a logic circuit that is configured to provide a clock signal as its output, where pulses in the combination signal cause the clock signal to be driven to a first state. The instructions cause the at least one processor to provide a reset signal to the logic circuit, where the reset signal is derived from the clock signal by delaying transitions to the first state while passing transitions from the first state without added delay. The clock signal is driven from the first state after passing a transition of the clock signal to the first state.

In various aspects of the disclosure, a clock recovery apparatus includes means for generating a combination signal that includes pulses that correspond to transition pulses generated in response to a transition in a difference signal representative of a difference in signaling state of a pair of wires in a three-wire bus. The clock recovery apparatus further includes means for providing the combination signal to a logic circuit that is configured to provide a clock signal as its output, where pulses in the combination signal cause the clock signal to be driven to a first state. The clock recovery apparatus further includes means for providing a reset signal to the logic circuit, where the reset signal is derived from the clock signal by delaying transitions to the first state while passing transitions from the first state without added delay. The clock signal is driven from the first state after passing a transition of the clock signal to the first state.

DETAILED DESCRIPTION

Figure 1:
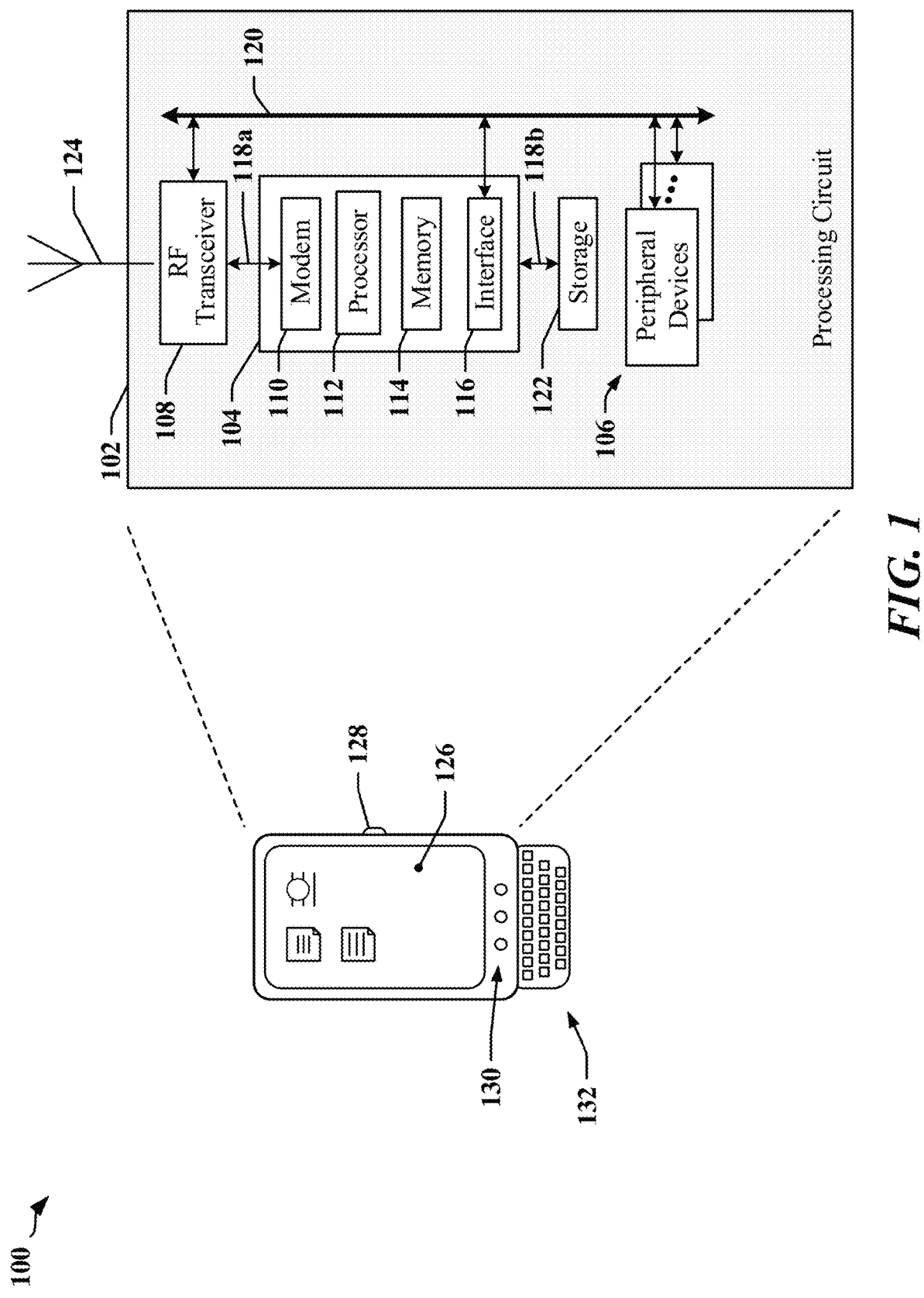
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smartwatch, a health or fitness tracker, eyewear, etc.), an appliance, a sensor, a security device, a vending machine, a smart meter, a drone, a multicopter, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted over a set of three wires, which may be referred to as a trio, or trio of wires. For each symbol transmission interval, a three-phase signal is transmitted in different phases on the wires of the trio, where the phase of the three-phase signal on each wire is defined by a symbol transmitted in the symbol transmission interval. Each trio provides a lane on a communication link. A symbol transmission interval may be defined as the interval of time in which a single symbol controls the signaling state of a trio. In each symbol transmission interval, one wire of the trio is undriven, while the remaining two wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +½V. Different symbols are transmitted in each consecutively transmitted pair of symbols, and different pairs of wires may be differentially driven in different symbol intervals.

More recent implementations and proposed specifications for C-PHY, including the C-PHY 1.2 specifications and C-PHY 2.0 specifications, define frequencies of symbol transmission clock signals that can exceed the capabilities of conventional CDR circuits to recover a clock signal at the receiver. The ability of a clock recovery circuit to recover clock information may be limited by the maximum time variation related to transitions of signals transmitted on the different wires of the communication link. Clock recovery circuits in C-PHY receivers typically employ a feedback loop that controls the generation of pulses in a receive clock signal. The feedback loop may be used to ensure that pulse generating circuits do not generate additional pulses triggered by transients that can occur before the conductors in the trio have assumed a stable signaling state before providing a sampling edge. Maximum symbol transmission rate may be limited by the feedback loop, and there is an ongoing need for optimized clock generation circuits that can function reliably at ever-higher signaling frequencies defined by later generations of C-PHY specifications.

Certain aspects disclosed herein provide a clock recovery circuit in a C-PHY receiver circuit, where a loop time of the C-PHY receiver circuit is minimized such that the clock recovery circuit can operate at next-generation C-PHY clock rates. In one example, the clock recovery circuit generates a combination signal that includes one or more transition pulses, provide the combination signal to a logic circuit that is configured to provide a clock signal as its output, provide a reset signal to the logic circuit that is derived from the clock signal by delaying transitions to the first state while passing transitions from the first state without added delay. Each transition pulse is generated responsive to a transition in a difference signal representative of a difference in signaling state of a pair of wires in a three-wire bus. Pulses in the combination signal cause the clock signal to be driven to a first state and the clock signal is driven from the first state after passing a transition of the clock signal to the first state.

The clock recovery circuit may generate a transition pulse for a first difference signal by performing an exclusive OR-gate function on the first difference signal and a delayed version of the first difference signal. The clock recovery circuit may configure at least one pulse generating circuit to provide corresponding transition pulses with a duration based on a minimum clock pulse duration defined for the logic circuit. The clock recovery circuit may calibrate at least one pulse generating circuit based on operating conditions of the three-wire bus. The clock recovery circuit may configure an asymmetric delay circuit to select a duration of a delay applied to transitions to the first state. The asymmetric delay circuit may include a rising-edge delay circuit configured to delay transitions from a low logic state to a high logic state, and further configured to pass transitions from the high logic state to the low logic state without added delay. The clock recovery circuit may provide the clock signal to a wire state decoder configured to decode symbols from transitions in signaling state of the three-wire bus based on timing information provided in the clock signal.

Example Of An Apparatus Employing A C-PHY Interface

FIG. 1 depicts an example of apparatus 100 that may be adapted in accordance with certain aspects disclosed herein. The apparatus 100 may employ C-PHY 3-phase protocols to implement one or more communication links. The apparatus 100 may include a processing circuit 102 having multiple circuits or devices 104, 106 and/or 108. In some examples, the circuits or devices 104, 106 and/or 108 may be implemented in one or more ASICs or in a system on chip (SoC), where an SoC may include an integrated circuit that implements all or substantially all of the components of a processor, computer or other electronic system. In one example, the apparatus 100 may be a communication device and the processing circuit 102 may include a processor 112 provided in a first circuit or device 104, one or more peripheral devices 106, and a transceiver 108 that enables the apparatus to communicate through an antenna 124 with a radio access network, a core access network, the Internet and/or another network.

The first circuit or device 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or processor-readable storage 122 provided on the processing circuit 102. The software modules may include instructions and data stored in the on-board memory 114 or other processor-readable storage 122. The first circuit or device 104 may access its on-board memory 114, the processor-readable storage 122, and/or storage external to the processing circuit 102. The on-board memory 114 and/or the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain circuits or devices 104, 106, and/or 108 to communicate. In one example, the first circuit or device 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
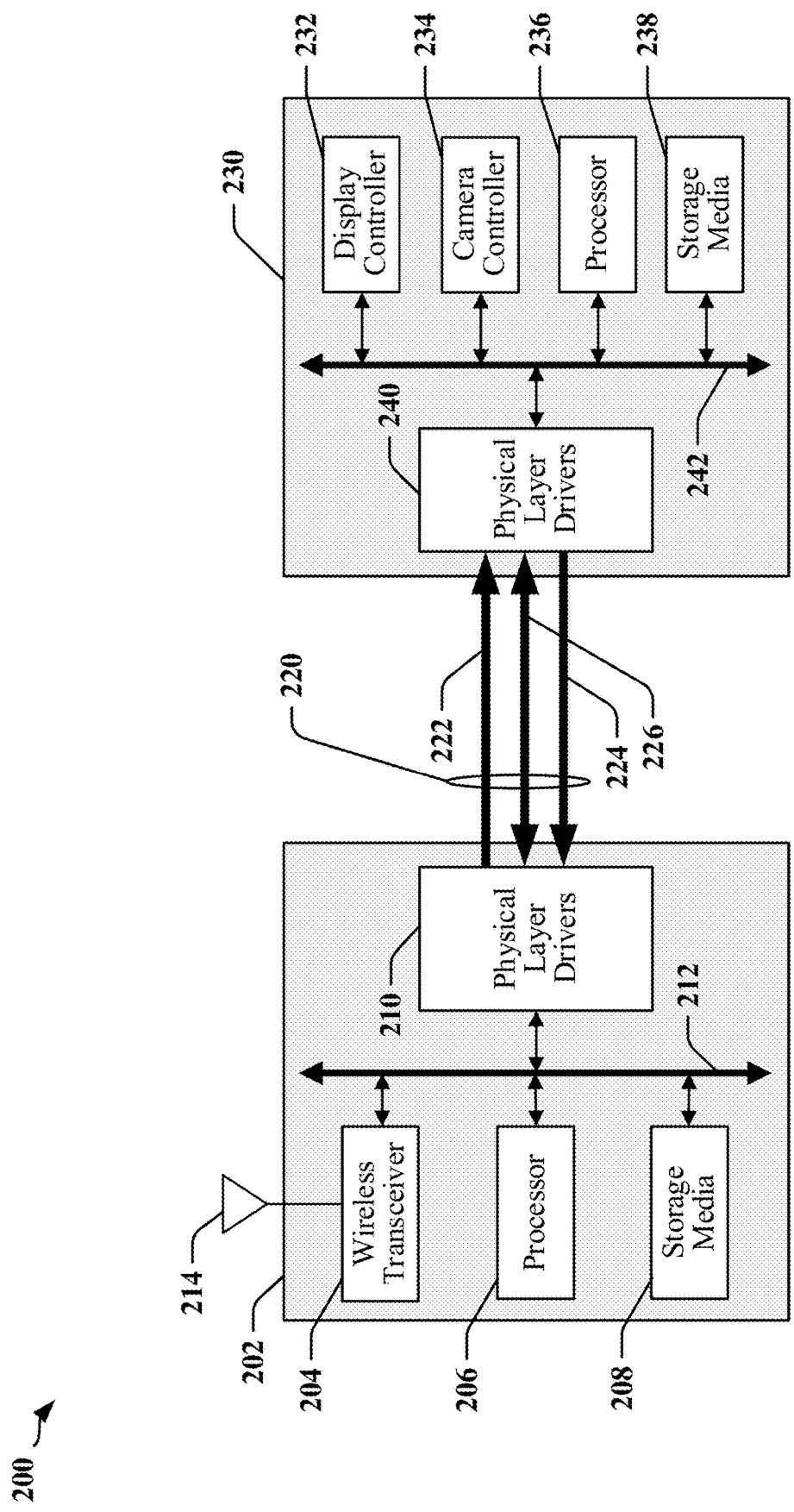
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236, controller or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal buses 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate, symbol transmission rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
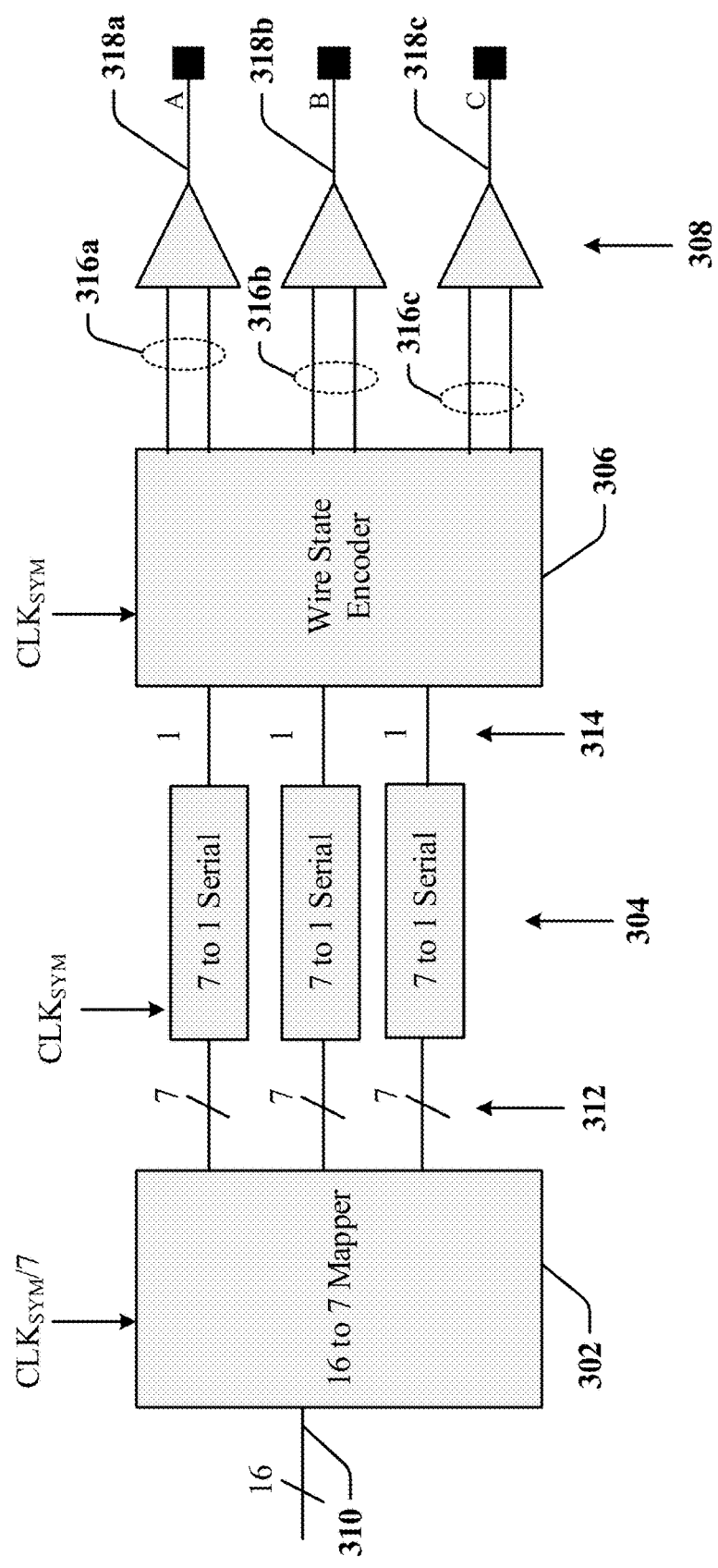
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 318a, 318b and/or 318c, and/or by driving a current through two of the signal wires 318a, 318b and/or 318c connected through a terminating resistor such that the current flows in different directions in the two signal wires 318a, 318b and/or 318c. The undriven state may be realized by placing an output of a driver of a signal wire 318a, 318b or 318c in a high-impedance mode. Alternatively, or additionally, an undriven state may be obtained on a signal wire 318a, 318b or 318c by passively or actively causing an "undriven" signal wire 318a, 318b or 318c to attain a voltage level that lies substantially halfway between positive and negative voltage levels provided on driven signal wires 318a, 318b and/or 318c. Typically, there is no significant current flow through an undriven signal wire 318a, 318b or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The line drivers 308 may be implemented as unit-level current-mode or voltage-mode drivers. In some implementations, each line driver 308 may receive sets of signals 316a, 316b and 316c that determine the output state of corresponding signal wires 318a, 318b and 318c. In one example, each of the sets of signals 316a, 316b and 316c may include two or more signals, including a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each symbol transmission interval in an M-wire, N-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol transmission interval, the signaling state of at least one signal wire 318a, 318b or 318c is changed from the wire state transmitted in the preceding transmission interval.

In operation, a mapper 302 may receive and map 16-bit data 310 to 7 symbols 312. In the 3-wire example, each of the 7 symbols defines the states of the signal wires 318a, 318b and 318c for one symbol transmission interval. The 7 symbols 312 may be serialized using parallel-to-serial converters 304 that provide a timed sequence of symbols 314 for each signal wire 318a, 318b and 318c. The sequence of symbols 314 is typically timed using a transmission clock, which may be referred to as a symbol clock ($CLK_{SYM}$). In one example, the period of the symbol clock defines the duration of the symbol transmission interval. A 3-wire, 3-phase encoder 306 receives the sequence of 7 symbols 314 produced by the mapper one symbol at a time and computes the state of each signal wire 318a, 318b and 318c for each symbol transmission interval. The 3-wire, 3-phase encoder 306 selects the states of the signal wires 318a, 318b and 318c based on the current input symbol 314 and the previous states of signal wires 318a, 318b and 318c.

The use of M-wire, N-phase encoding permits a number of bits to be encoded in a plurality of symbols where the bits per symbol is not an integer. In the example of a 3-wire communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
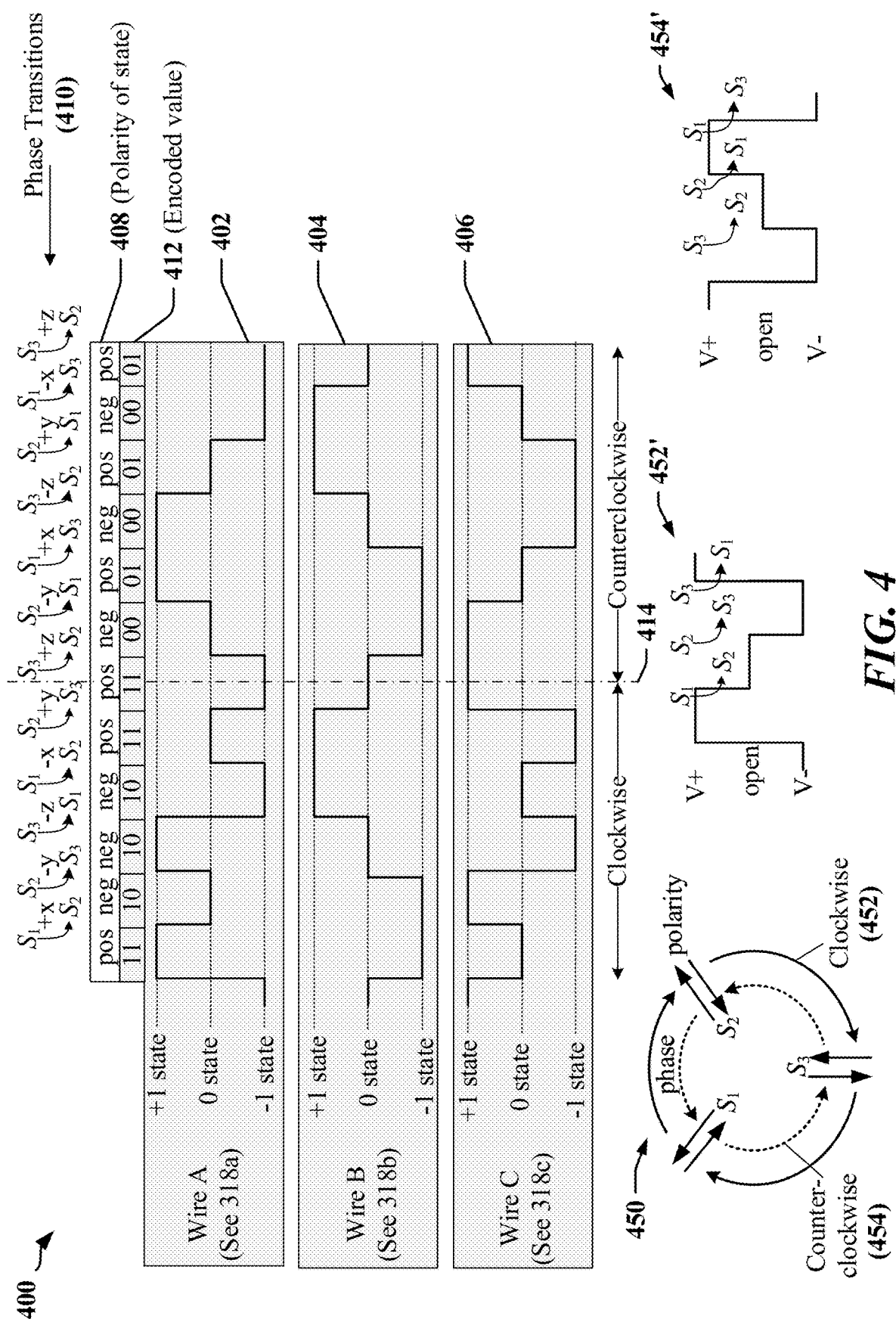
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_3$ to $S_2$, from $S_2$ to $S_1$ and from $S_1$ to $S_3$. The three signal wires 318a, 318b and 318c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318a, 318b and 318c is in a different signaling state than the other wires. When more than 3 signal wires 318a, 318b and 318c are used in a 3-phase encoding system, two or more signal wires 318a, 318b and/or 318c can be in the same signaling state at each signaling interval, although each state is present on at least one signal wire 318a, 318b and/or 318c in every signaling interval.

Information may be encoded in the direction of rotation at each phase transition 410, and the 3-phase signal may change direction for each signaling state. Direction of rotation may be determined by considering which signal wires 318a, 318b and/or 318c are in the '0' state before and after a phase transition, because the undriven signal wire 318a, 318b and/or 318c changes at every signaling state in a rotating three-phase signal, regardless of the direction of rotation.

The encoding scheme may also encode information in the polarity 408 of the two signal wires 318a, 318b and/or 318c that are actively driven. At any time in a 3-wire implementation, exactly two of the signal wires 318a, 318b, 318c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318a, 318b and 318c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

Figure 5:
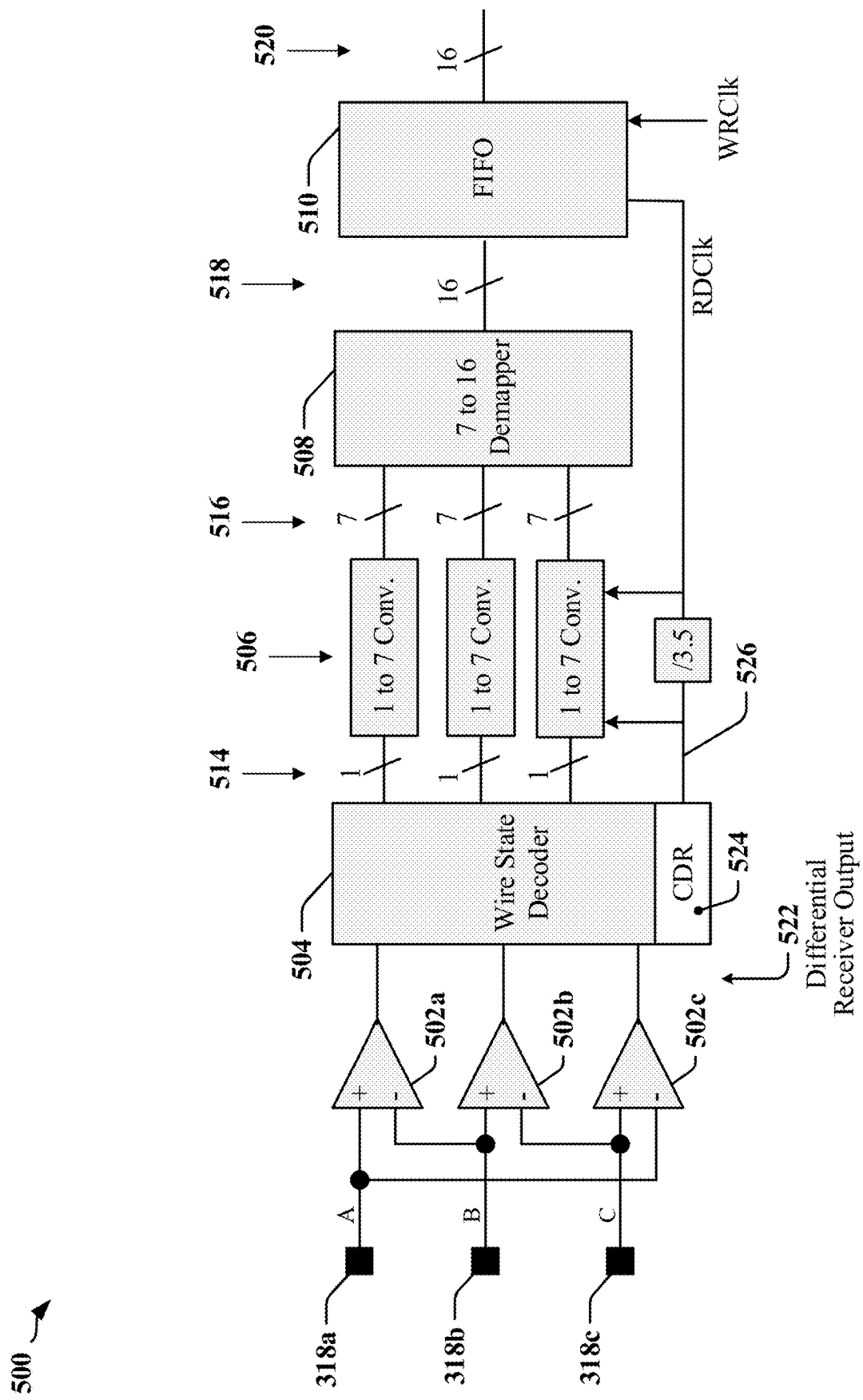
FIG. 5 illustrates a C-PHY 3-phase receiver.

FIG. 5 is a diagram illustrating certain aspects of a 3-wire, 3-phase decoder 500. Differential receivers 502a, 502b, 502c and a wire state decoder 504 are configured to provide a digital representation 522 of the state of the three transmission lines (e.g., the signal wires 318a, 318b and 318c illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 to provide output data 520.

The wire state decoder 504 may extract a sequence of symbols 514 from phase encoded signals received on the signal wires 318a, 318b and 318c. The symbols 514 are encoded as a combination of phase rotation and polarity as disclosed herein. The wire state decoder may include a CDR circuit 524 that extracts a clock 526 that can be used to reliably capture wire states from the signal wires 318a, 318b and 318c. A transition occurs on least one of the signal wires 318a, 318b and 318c at each symbol boundary and the CDR circuit 524 may be configured to generate the clock 526 based on the occurrence of a transition or multiple transitions. An edge of the clock may be delayed to allow time for all signal wires 318a, 318b and 318c to have stabilized and to thereby ensure that the current wire state is captured for decoding purposes.

Figure 6:
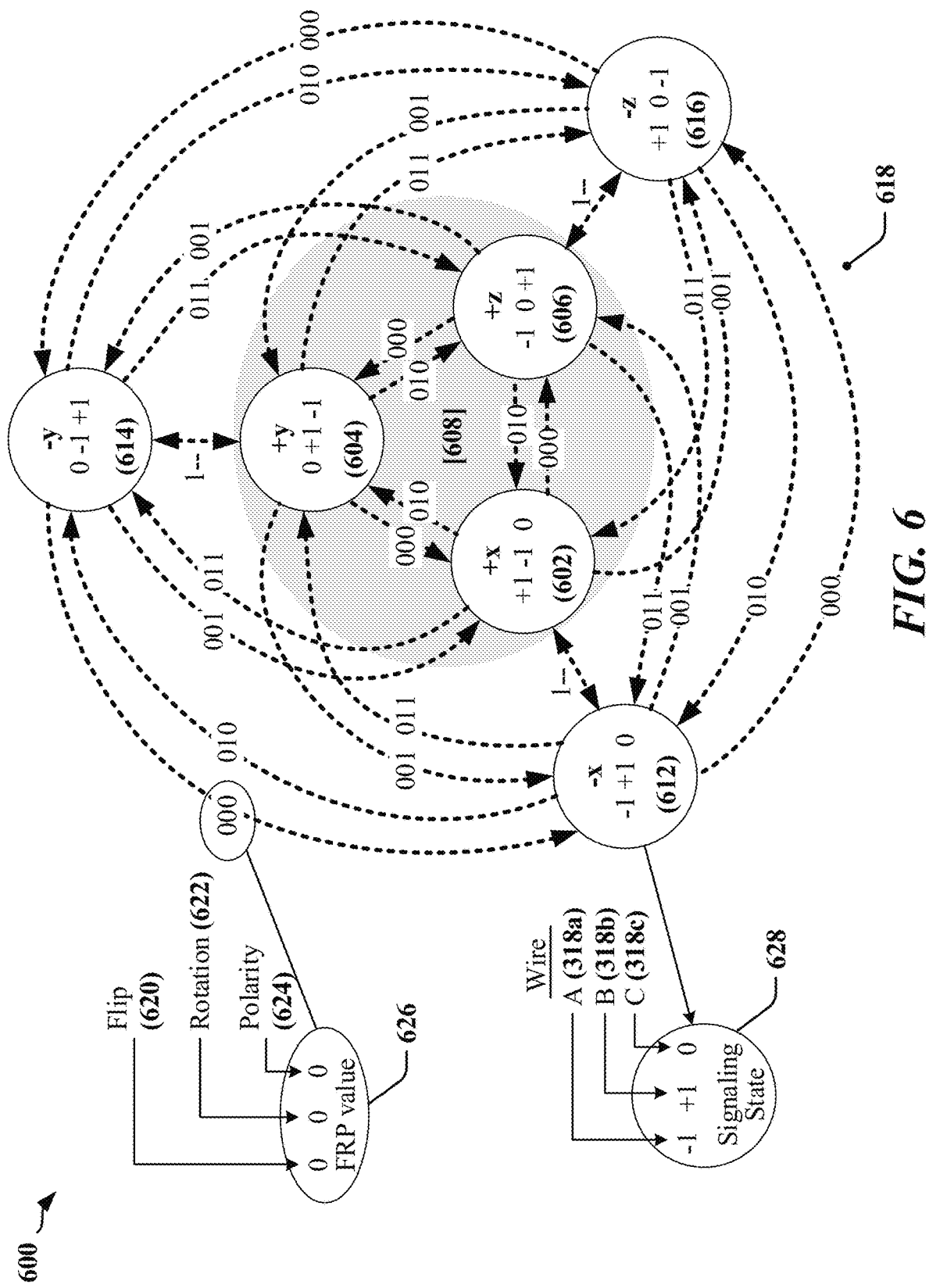
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible signaling states 602, 604, 606, 612, 614 and 616 in the state diagram 600 include and expand on the states shown in the circular state diagram 450 of FIG. 4. As shown in the exemplar of a state element 628, each signaling state 602, 604, 606, 612, 614 and 616 in the state diagram 600 defines voltage signaling state of the signal wires 318a, 318b, 318c, which are labeled A, B and C respectively. For example, in signaling state 602 (+x) wire A=+1, wire B=−1 and wire C=0, yielding output of differential receiver 502a (A-B)=+2, differential receiver 502b (B-C)=−1 and differential receiver 502c (C-A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity signaling states 602, 604, 606 and an outer circle 618 that encompasses the negative polarity signaling states 612, 614, 616.

Jitter In 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
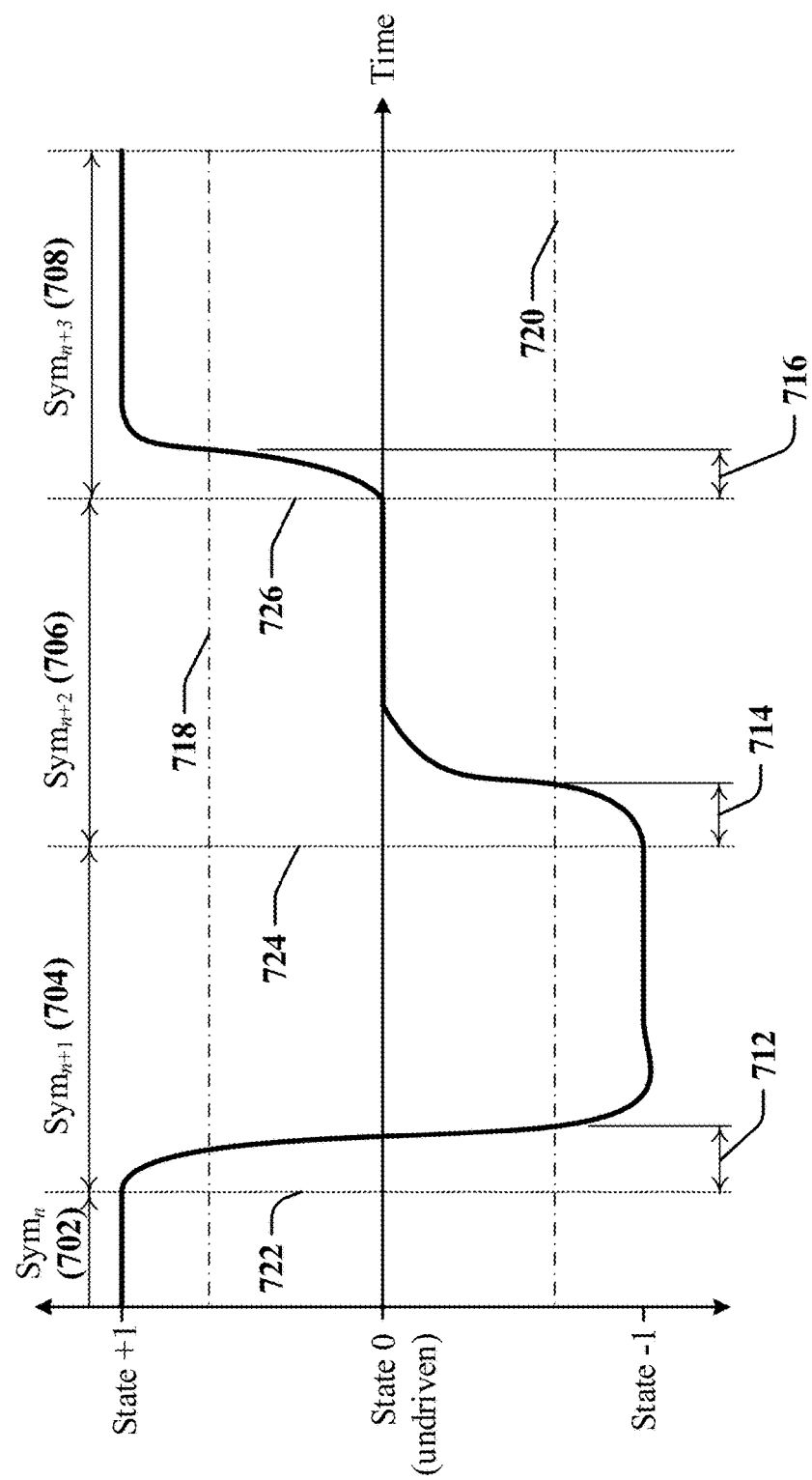
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 310a, 310b or 310c. A first symbol $Sym_n$ 702 is transmitted in a first symbol interval that ends at a point in time 722 after which a second symbol $Sym_{n+1}$ 704 is transmitted in a second symbol interval. The second symbol interval may end at a point in time 724 after which a third symbol $Sym_{n+2}$ 706 is transmitted in the third symbol interval, which ends at a point in time 726 after which a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 310a, 310b or 310c to reach a threshold voltage 718 and/or 720. The threshold voltages may be used to determine the state of the signal wire 310a, 310b or 310c. The transition from a state determined by the second symbol 704 to the state for the third symbol 706 may be detectable after a delay 714 attributable to the time taken for voltage in the signal wire 310a, 310b or 310c to reach one of the threshold voltages 718 and/or 720. The transition from a state determined by the third symbol 706 to the state for the fourth symbol 708 may be detectable after a delay 716 attributable to the time taken for voltage in the signal wire 310a, 310b or 310c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
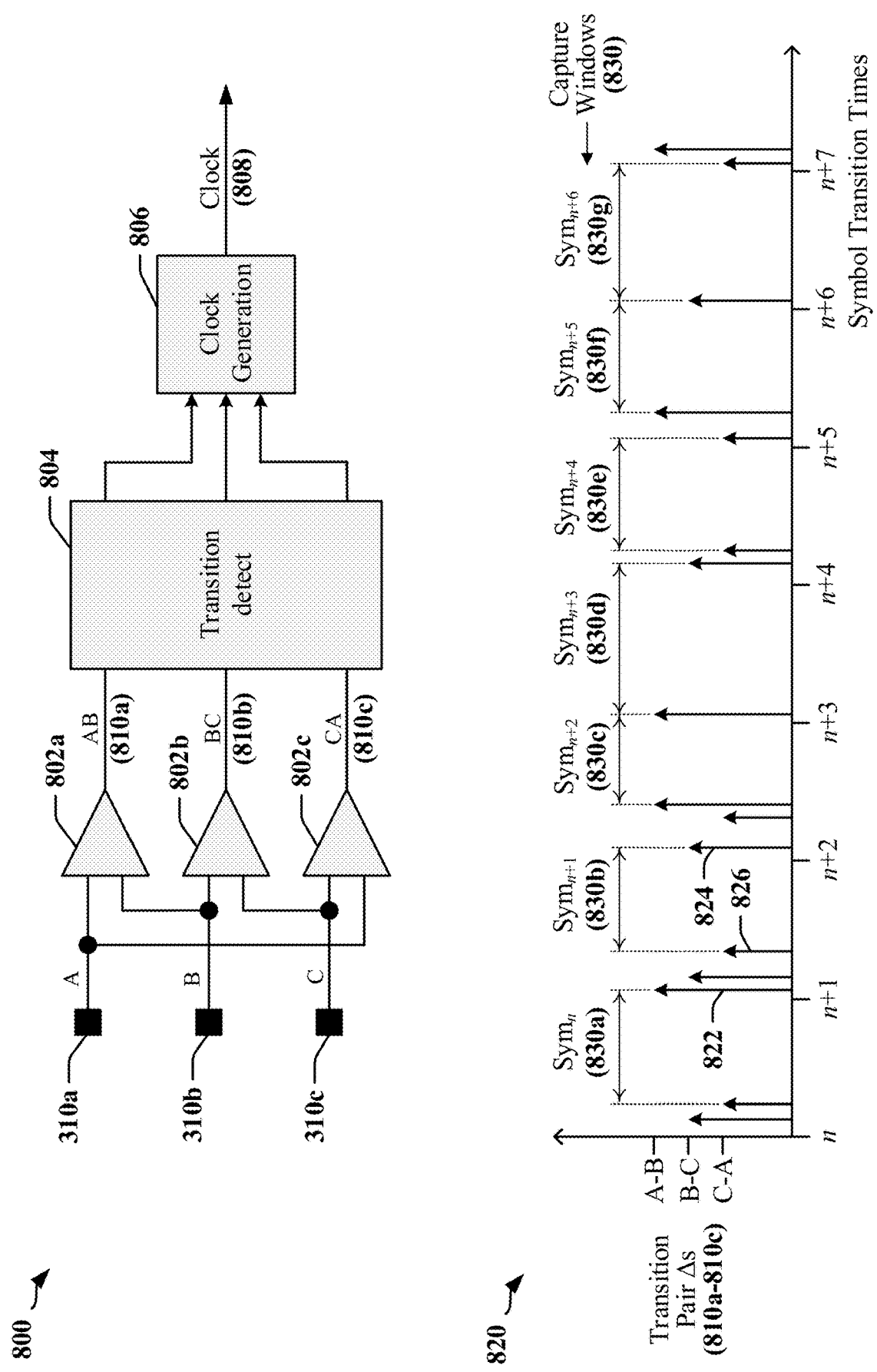
FIG. 8 illustrates transition detection in a C-PHY decoder.

FIG. 8 illustrates certain aspects of CDR circuits that may be provided in a receiver in a C-PHY interface 800. Differential receivers 802a, 802b and 802c are configured to generate a set of difference signals 810a, 810b, 810c by comparing signaling state of each different pair of signal wires 310a, 310b and 310c in a trio. In the illustrated example, a first differential receiver 802a provides an AB difference signal 810a representative of the difference in signaling state of A and B signal wires 310a and 310b, a second differential receiver 802b provides a BC difference signal 810b representative of the difference in signaling state of B and C signal wires 310b and 310c and a third differential receiver 802c provides a CA difference signal 810c representative of the difference in signaling state of C and A signal wires 310c and 310a. Accordingly, a transition detection circuit 804 can be configured to detect occurrence of a phase change because the output of at least one of the differential receivers 802a, 802b and 802c changes at the end of each symbol interval.

Transitions between some consecutively transmitted pairs of symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. Accordingly, a clock generation circuit 806 may include or cooperate with a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires in a trio may be detected at different times, which can result in the difference signals 810a, 810b, 810c assuming stable states at different times. The state of the difference signals 810a, 810b, 810c may switch before stability has been reached after the signaling state of each signal wire 310a, 310b and/or 310c has transitioned to its defined state for a symbol transmission interval. The result of such variability is illustrated in the timing diagram 820 of FIG. 8.

The timing of signaling state change detection may vary according to the type of signaling state change that has occurred. Markers 822, 824 and 826 represent occurrences of transitions in the difference signals 810a, 810b, 810c provided to the transition detection circuit 804. The markers 822, 824 and 826 are assigned different heights in the timing diagram 820 for clarity of illustration only, and the relative heights of the markers 822, 824 and 826 are not intended to show a specific relationship to voltage or current levels, polarity or weighting values used for clock generation or data decoding. The timing diagram 820 illustrates the effect of timing of transitions associated with symbols transmitted in phase and polarity on the three signal wires 310a, 310b and 310c. In the timing diagram 820, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communication link may be affected by duration and variability in signal transition times. For example, variability in detection circuits may be caused by manufacturing process tolerances, variations and stability of voltage and current sources and operating temperature, as well as by the electrical characteristics of the signal wires 310a, 310b and 310c. The variability in detection circuits may limit channel bandwidth.

Figure 9:
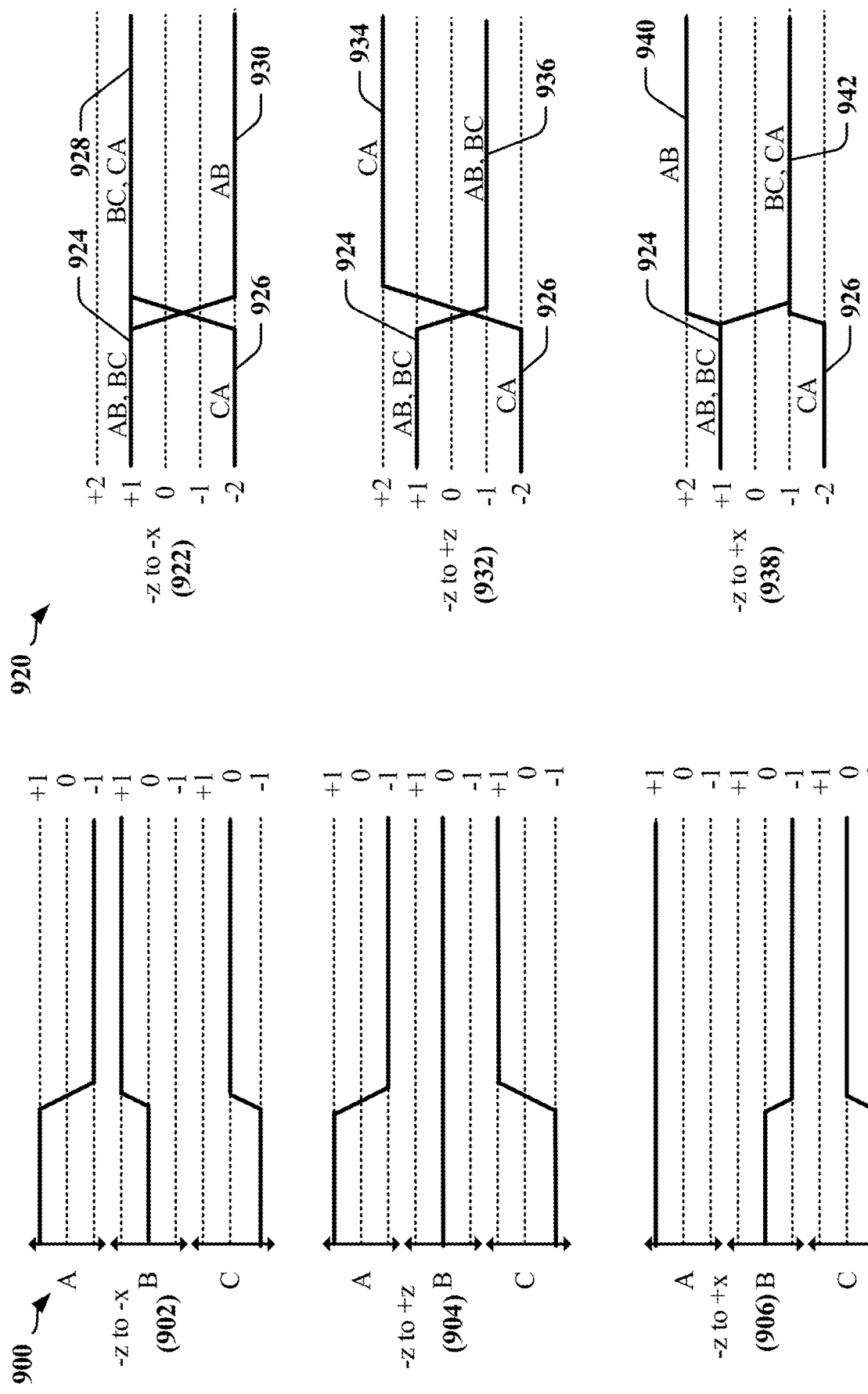
FIG. 9 illustrates one example of signal transitions occurring between pairs of consecutive symbols transmitted on a C-PHY interface.

FIG. 9 includes timing diagrams 900 and 920 representative of certain examples of transitions from a first signaling state to a second signaling state between certain consecutive symbols. The signaling state transitions illustrated in the timing diagrams 900 and 920 are selected for illustrative purposes, and other transitions and combinations of transitions can occur in a MIPI Alliance C-PHY interface. The timing diagrams 900 and 920 relate to an example of a 3-wire, 3-phase communication link, in which multiple receiver output transitions may occur at each symbol interval boundary due to differences in rise and fall time between the signal levels on the trio of wires. With reference also to FIG. 8, the first timing diagrams 900 illustrate the signaling states of the trio of signal wires 310a, 310b and 310c (A, B, and C) before and after a transition and second timing diagrams 920 illustrate the outputs of the differential receivers 802a, 802b and 802c, which provides difference signals 810a, 810b, 810c representative of the differences between signal wires 310a, 310b and 310c. In many instances, a set of differential receivers 802a, 802b and 802c may be configured to capture transitions by comparing different combinations for two signal wires 310a, 310b and 310c. In one example, these differential receivers 802a, 802b and 802c may be configured to produce outputs by determining the difference (e.g. by subtraction) of their respective input voltages.

In each of the examples shown in the timing diagrams 900 and 920, the initial a symbol representing the −z state 616 (see FIG. 6) transitions to a different symbol. As shown in the timing diagrams 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing diagrams 922, 932, 938 for the differential receiver outputs.

In a first example corresponding to the timing diagrams 902, 922, a transition occurs from a symbol representing the −z state 616 to a symbol representing the −x signaling state 612 (see FIG. 6) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing diagrams 904, 932, a transition occurs from a symbol representing the −z state 616 to a symbol representing the +z signaling state 606 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing diagrams 906, 938, a transition occurs from a symbol representing the −z state 616 to a symbol representing the +x signaling state 602 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
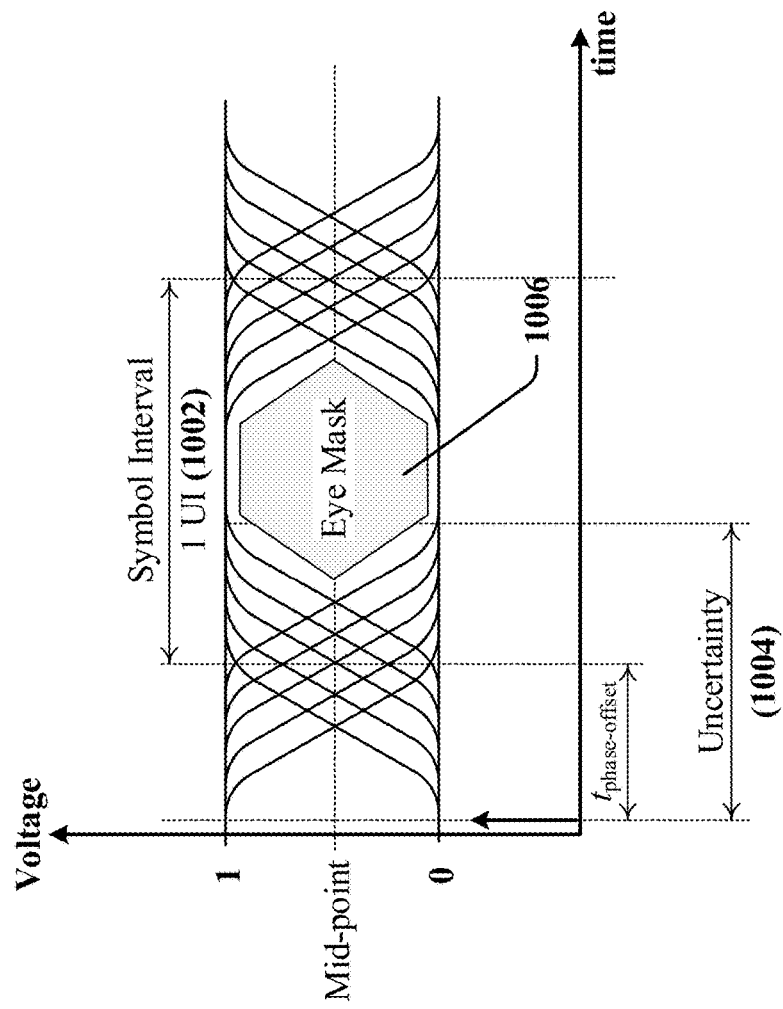
FIG. 10 illustrates transition regions and eye regions in an eye-pattern.

FIG. 10 illustrates a binary eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where a binary eye pattern 1000 can be utilized as a basis for judging the ability to reliably recover data based on the eye opening of the binary eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 8).

Figure 11:
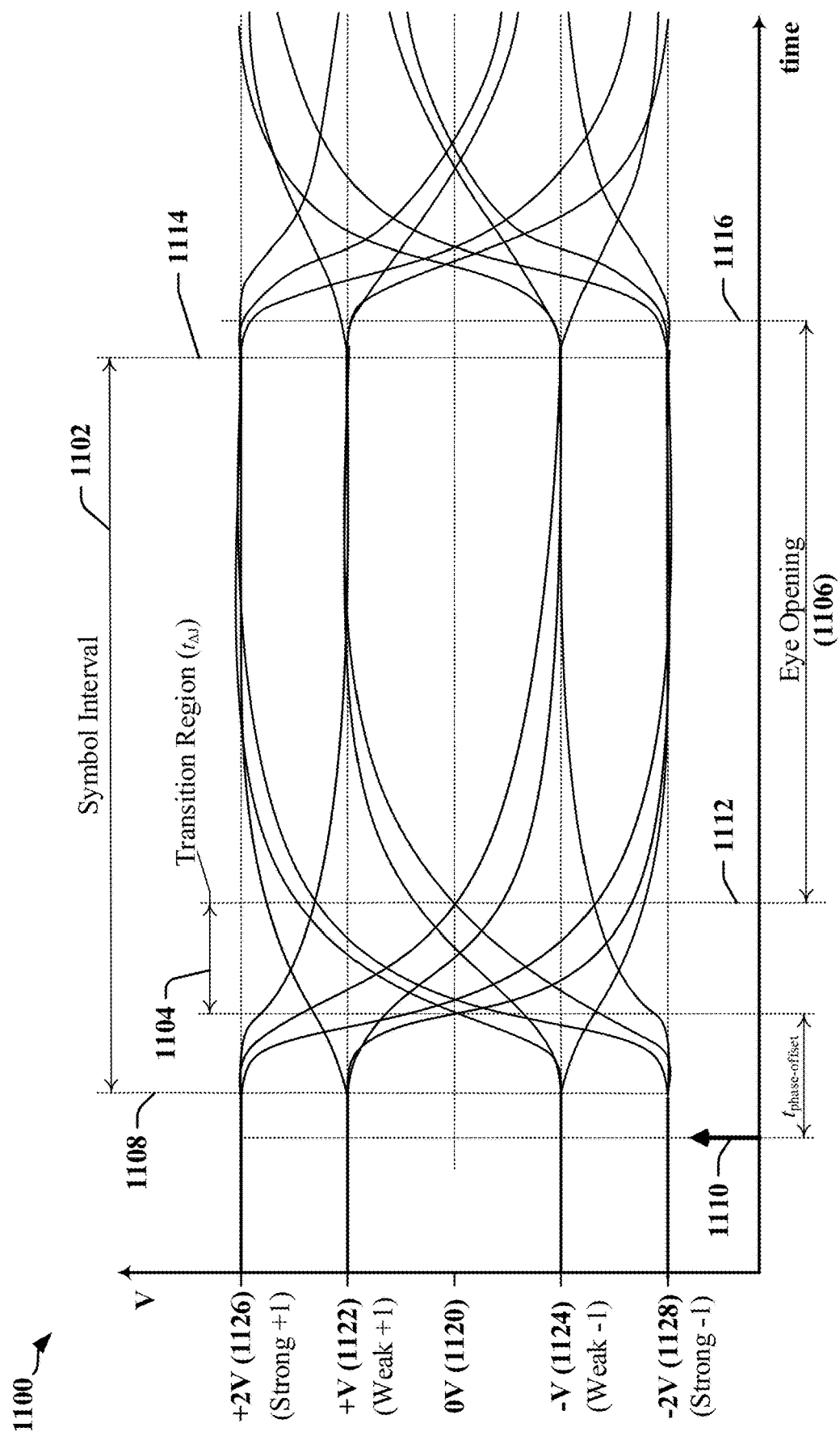
FIG. 11 illustrates an example of an eye-pattern generated for a C-PHY 3-Phase interface.

FIG. 11 illustrates an example of a multi-level eye-pattern 1100 generated for a C-PHY 3-phase signal. The multi-level eye-pattern 1100 may be generated from an overlay of multiple symbol intervals 1102. The multi-level eye-pattern 1100 may be produced using a fixed and/or symbol-independent trigger 1110. The multi-level eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the multi-level eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 310a, 310b and 310c is undriven in any symbol and the differential receivers 802a, 802b, and 802c do not produce a 0 state (here, 0 Volts) output. The voltages associated with strong and weak levels need not be evenly spaced with respect to a 0 Volts level. For example, the weak voltage levels 1122, 1124 represent a comparison of voltages that may include the voltage level reached by an undriven signal wire 310a, 310b and 310c. The multi-level eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810a, 810b, 810c representing comparisons of three pairs of signals (A-B, B-C, and C-A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 310a, 310b, 310c and due to slight differences in signal propagation times between the combinations of pairs of signals received from the signal wires 310a, 310b, 310c. The multi-level eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 310a, 310b, 310c and/or the outputs of the three differential receivers 802a, 802b and 802c have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 524 in the decoder 500 illustrated in FIG. 5, for example. Different signaling state transitions may be associated with different variations in signal transition times corresponding to two or more signal wires 310a, 310b and/or 310c, thereby causing the outputs of the differential receivers 802a, 802b and 802c in the receiving device to change at different times and/or rates with respect to the symbol interval boundary 1108, where the inputs of the differential receivers 802a, 802b and 802c begin to change. The differences between signal transition times may result in timing skews between signaling transitions in two or more difference signals 810a, 810b, 810c. CDR circuits may include delay circuits and other circuits to accommodate timing skews between the difference signals 810a, 810b, 810c.

Figure 12:
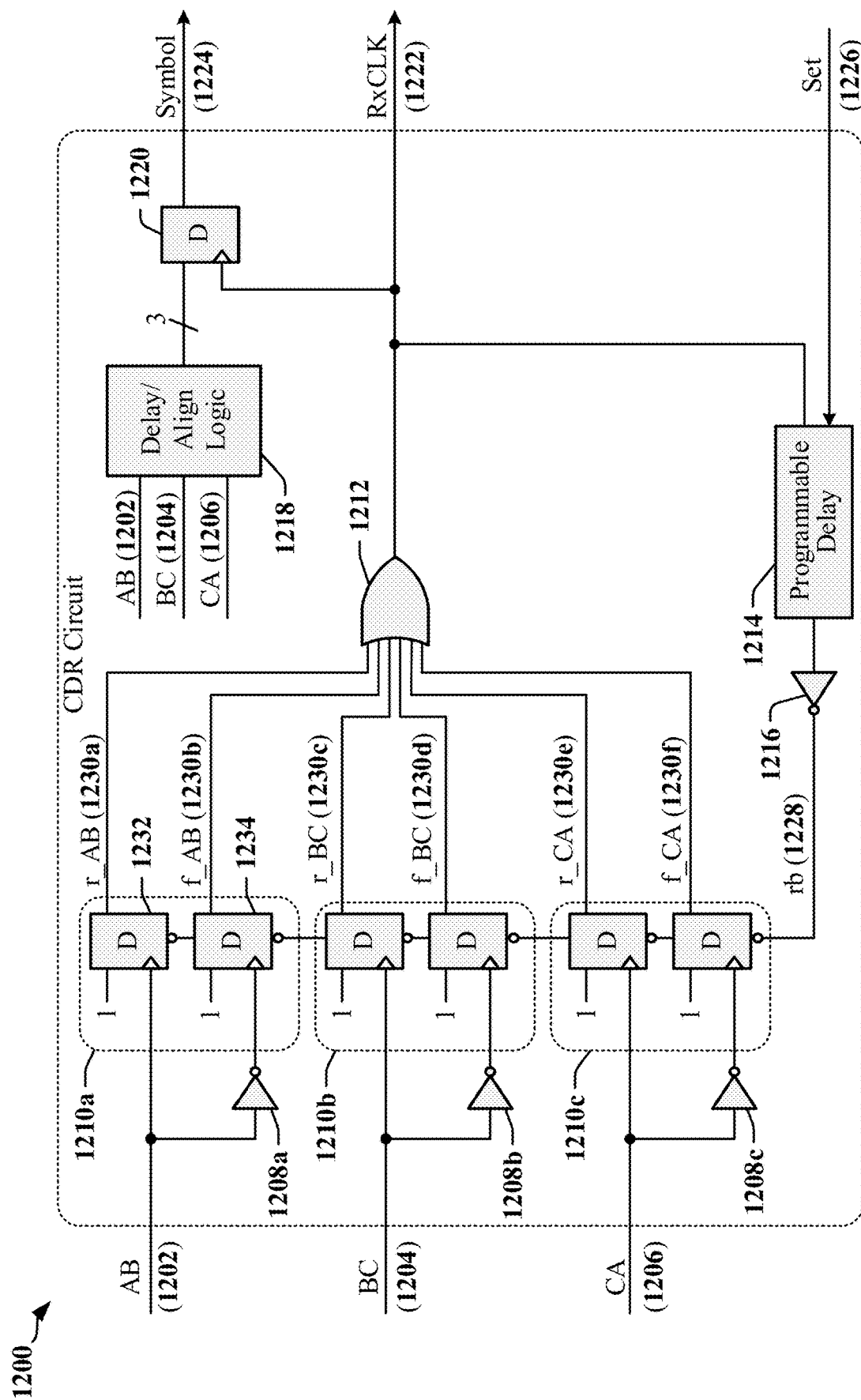
FIG. 12 illustrates an example of a CDR circuit for a C-PHY 3-Phase interface.

FIG. 12 provides an example of a CDR circuit 1200 for a 3-wire, 3-phase interface. The illustrated CDR circuit 1200 includes certain features and functional elements that are common to many different types of clock recovery circuits. The CDR circuit 1200 receives difference signals 1202, 1204, 1206, which may be derived from the difference signals 810a, 810b, 810c produced by the differential receivers 802a, 802b and 802c of FIG. 8 for example. In the CDR circuit 1200, each difference signal 1202, 1204, 1206 clocks a pair of D flipflops 1210a, 1210b, 1210c to produce output signals 1230a-1230f. The output signals 1230a-1230f carry a pulse when a transition is detected on the corresponding difference signal 1202, 1204, 1206. A rising edge provided to a clock input on a D flipflop clocks a logic one through the D flipflop. Inverters 1208a, 1208b, 1208c may be used to provide inverted versions of the difference signals 1202, 1204, 1206 to one of the D flipflops in each corresponding pair of D flipflops 1210a, 1210b, 1210c. Accordingly, each pair of D flipflops 1210a, 1210b, 1210c produces pulses responsive to rising edge and falling edges detected in the corresponding difference signal 1202, 1204, 1206.

For example, the AB difference signal 1202 is provided to a first D flipflop 1232 of a first pair of D flipflops 1210a, and the inverter 1208a provides an inverted version of the AB difference signal 1202 to a second D flipflop 1234 of the first pair of D flipflops 1210a. The D flipflops are initially in a reset state. A rising edge on the AB difference signal 1202 clocks a logic one through the first D flipflop 1232 causing the output of the first flipflop (r_AB) 1230a to transition to a logic one state. A falling edge on the AB difference signal 1202 clocks a logic one through the second D flipflop 1234 causing the output of the second flipflop (f_AB) 1230b to transition to a logic one state.

The output signals 1230a-1230f are provided to logic, such as the OR gate 1212, which produces an output signal that may serve as the receiver clock (RxCLK) signal 1222. The RxCLK signal 1222 transitions to a logic one state when a transition occurs in signaling state of any of the difference signals 1202, 1204, 1206. The RxCLK signal 1222 is provided to a programmable delay circuit 1214, which drives a reset signal (rb signal 1228) that resets the D flipflops in the pairs of D flipflops 1210a, 1210b, 1210c. In the illustrated example, an inverter 1216 may be included when the D flipflops 1210a, 1210b, 1210c are reset by a low signal. When the D flipflops 1210a, 1210b, 1210c are reset, the output of the OR gate 1212 returns to the logic 0 state and the pulse on the RxCLK signal 1222 is terminated. When this logic 0 state propagates through the programmable delay circuit 1214 and the inverter 1216, the reset condition on the D flipflops 1210a, 1210b, 1210c is released. While the D flipflops 1210a, 1210b, 1210c are in the reset condition, transitions on the difference signals 1202, 1204, 1206 are ignored.

The programmable delay circuit 1214 is typically configured to produce a delay that has a duration that exceeds the difference in the timing skew between the occurrence of first and last transitions on the difference signals 1202, 1204, 1206. The programmable delay circuit 1214 configures the duration of pulses (i.e., the pulse width) on the RxCLK signal 1222. The programmable delay circuit 1214 may be configured when a Set signal 1226 is asserted by a processor or other control and/or configuration logic.

The RxCLK signal 1222 may also be provided to a set of three flipflops 1220 that capture the signaling state of the difference signals 1202, 1204, 1206, providing a stable output symbol 1224 for each pulse that occurs on the RxCLK signal 1222. Delay or alignment logic 1218 may adjust the timing of the set of difference signals 1202, 1204, 1206. For example, the delay or alignment logic 1218 may be used to adjust the timing of the difference signals 1202, 1204, 1206 with respect to the pulses on the RxCLK signal 1222 to ensure that the flipflops 1220 capture the signaling state of the difference signals 1202, 1204, 1206 when the difference signals 1202, 1204, 1206 are stable. The delay or alignment logic 1218 may delay edges in the difference signals 1202, 1204, 1206 based on the delay configured for the programmable delay circuit 1214.

The programmable delay circuit 1214 may be configured in the CDR circuit 1200 to accommodate possible large variations in transition times in the difference signals 1202, 1204, 1206. In one example, the programmable delay circuit 1214 is typically configured to provide a minimum delay period that exceeds the duration of the timing skew between the occurrence of the first and last transitions on the difference signals 1202, 1204, 1206. The delay time provided by the programmable delay circuit 1214 is calculated to account for the number of logic gates in the delay loop of the CDR circuit 1200 and is constrained to a minimum delay time that accounts for expected or observed variances in manufacturing process, circuit supply voltage, and temperature (PVT) conditions that can affect operation of the logic gates and/or the programmable delay circuit 1214. For reliable operation of the CDR circuit 1200, the maximum delay time provided by the programmable delay circuit 1214 may not be greater than the symbol interval. At faster data rates, timing skew and the delay time provided by the delay loop of the CDR circuit 1200 increase as a proportion of the symbol interval 1102. The eye opening 1106 can become small in comparison to the symbol interval 1102 and the eye opening 1106 can close at higher frequencies. The maximum symbol transmission rate may be limited when the delay time provided by the programmable delay circuit 1214 reduces the percentage of the symbol interval 1102 occupied by the eye opening 1106 below a threshold size that can support reliable capture of symbols.

Figure 13:
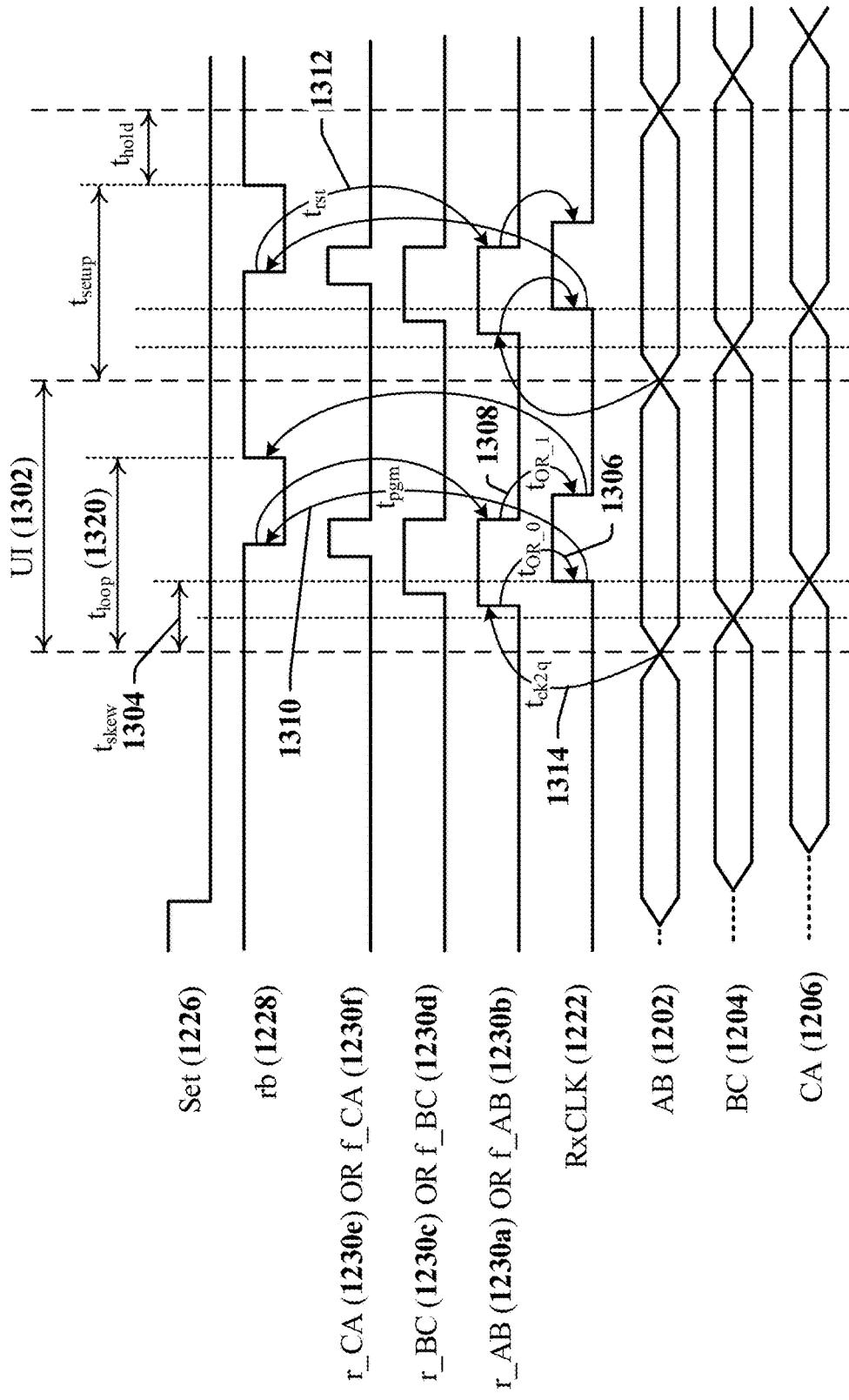
FIG. 13 illustrates timing associated with the CDR circuit of FIG. 12.

FIG. 13 is a timing diagram 1300 that illustrates certain aspects of the operation of the CDR circuit 1200. The diagram relates to operations after the programmable delay circuit 1214 has been configured, and the Set signal 1226 is inactive. The CDR circuit 1200 operates as an edge detector. C-PHY 3-phase encoding provides a single signaling state transition per unit interval (UI) 1302. Differences in the state of each wire of the trio, and/or transmission characteristics of the trio may cause a transition to appear at different times on two or more wires. The maximum difference in time of occurrence of transitions in the difference signals 1202, 1204, 1206 may be referred to as the skew time ($t_{skew}$) 1304. Other delays associated with the CDR circuit 1200 include the propagation delay ($t_{ck2q}$) 1314 through the pairs of D flipflops 1210a, 1210b, 1210c, the propagation delay ($t_{OR\_0}$) 1306 associated with a rising edge passed through the OR gate 1212, the propagation delay ($t_{OR\_1}$) 1308 associated with a falling edge passed through the OR gate 1212, the programmable delay ($t_{pgm}$) 1310 combining the delay introduced by the programmable delay circuit 1214 and a driver and/or inverter 1216, and the reset delay ($t_{rst}$) 1312 corresponding to the delay between time of receipt of the rb signal 1228 by the pairs of D flipflops 1210a, 1210b, 1210c and time at which the flipflop outputs are cleared.

A loop delay ($t_{loop}$ 1320) may be defined as:

$$t_{loop} = t_{ck2q} + t_{OR\_1} + t_{pgm} + t_{rst} + t_{OR\_0} + t_{pgm}.$$

The relationship between $t_{loop}$ 1320 and the UI 1302 may determine the reliability of operation of the CDR circuit 1200. This relationship is affected by clock frequency used for transmission, which has a direct effect on the UI 1302, and variability in the operation of the programmable delay circuit 1214.

In some devices, the operation of the programmable delay circuit 1214 in FIG. 12 can be afflicted by variations in operating conditions, including variations in PVT conditions. The delay time provided by the programmable delay circuit 1214 for a configured value may vary significantly from device to device, and/or from circuit to circuit within a device. In conventional systems, the nominal operating condition of the CDR circuit 1200 is generally set by design to generate a clock edge somewhere in the middle of the eye opening 1106 under all PVT conditions, in order to ensure that a clock edge occurs after the end 1112 of the signal transition region 1104 and prior to the commencement of the transition region to the next symbol, even under worst case PVT effects. Difficulty can arise in designing a CDR circuit 1200 that guarantees a clock edge within the eye opening 1106 when the transmission frequency increases and timing skew of the difference signals 1202, 1204, 1206 is large compared to the UI 1302. For example, a typical delay circuit may produce a delay value that changes by a factor of 2 over all PVT conditions.

Figure 14:
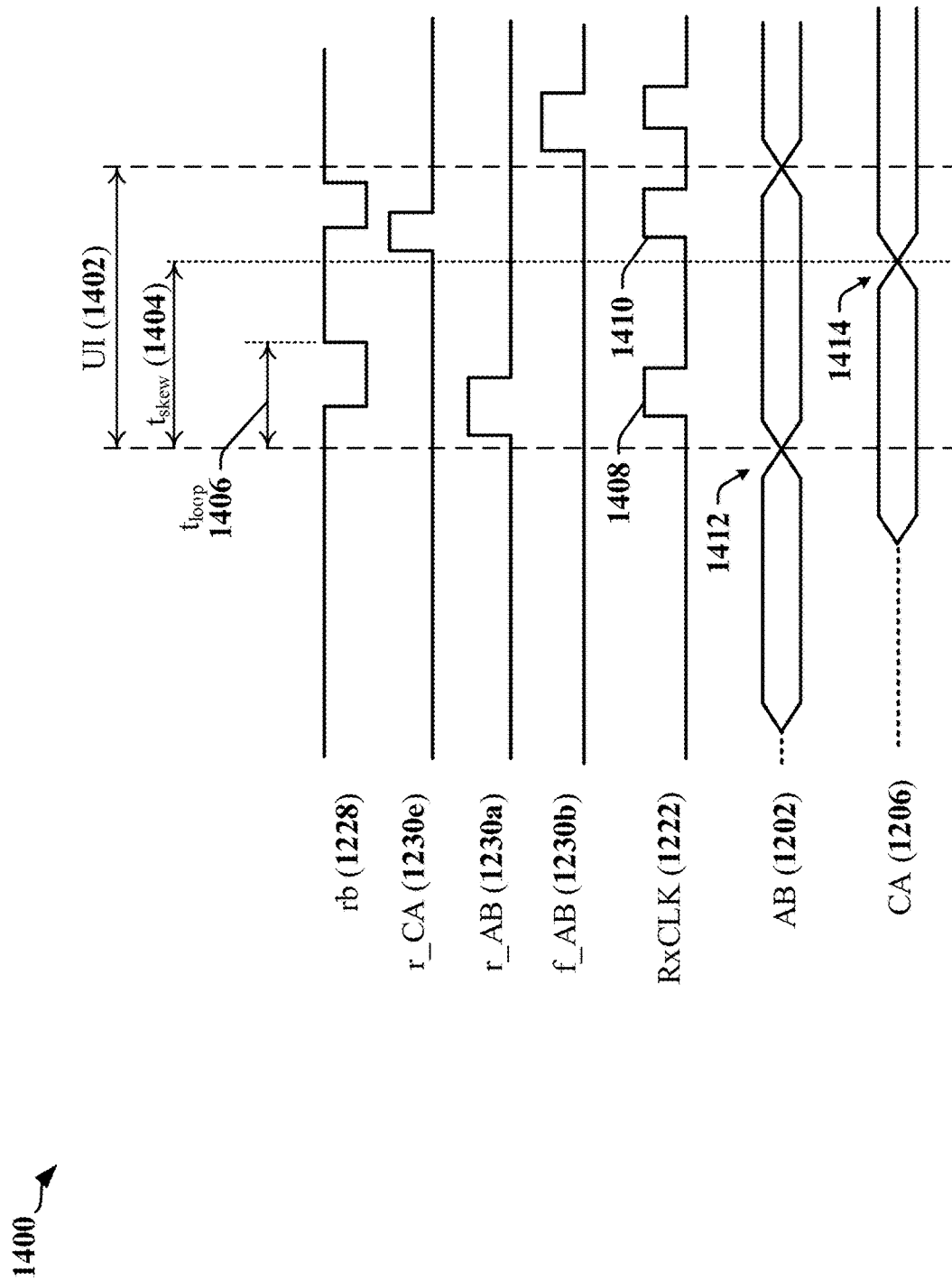
FIG. 14 illustrates timing associated with a CDR circuit that has a loop time that is shorter than the skew between signals transmitted on the C-PHY 3-Phase signal.

FIG. 14 is a timing diagram 1400 that illustrates the effect of a programmable delay circuit 1214 (see FIG. 12) that provides an insufficient delay. In this example, $t_{loop}$ 1406 is too short for the observed $t_{skew}$ 1404, and multiple clock pulses 1408, 1410 are generated in one UI 1402. That is, the loop delay $t_{loop}$ 1406 is not big enough relative to $t_{skew}$ 1404, and later occurring transitions on the difference signals 1202, 1204, 1206 are not masked. In the depicted example, a second transition 1414 in one of the difference signals 1206 may be detected after a pulse 1408 has been generated in response to a first occurring transition 1412 in another of the difference signals 1202. In this example, the recovered clock frequency may be twice the clock frequency used to transmit symbols on the 3-phase interface.

Figure 15:
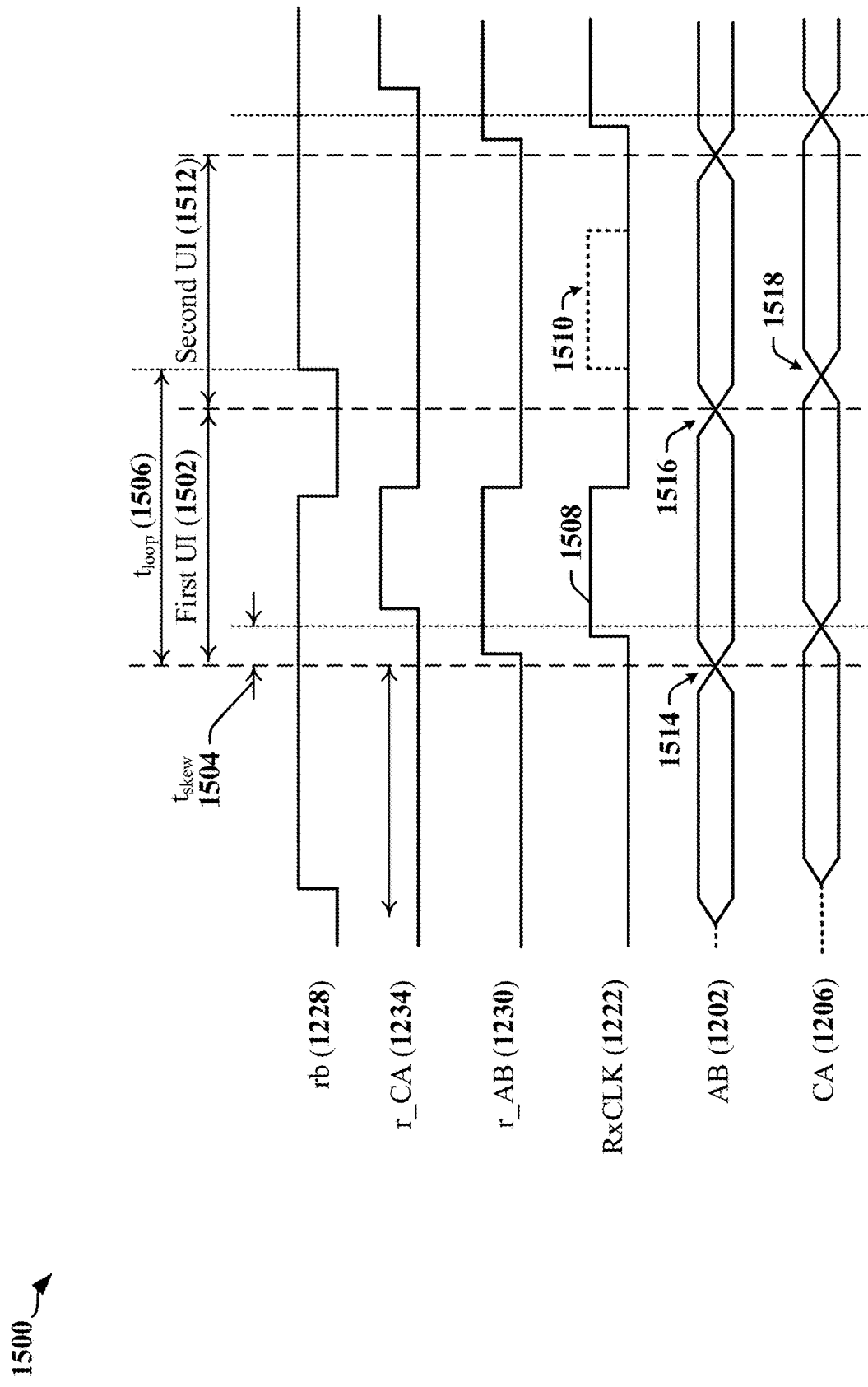
FIG. 15 illustrates timing associated with a CDR circuit that has a loop time that is longer than a symbol interval of the C-PHY 3-Phase signal.

FIG. 15 is a timing diagram 1500 that illustrates the effect of a programmable delay circuit 1214 that provides a delay that is too long. In this example, there is an observed skew of duration $t_{skew}$ 1504 and $t_{loop}$ 1506 is greater than the UI 1502. The CDR circuit 1200 may generate a clock pulse 1508 in response to a first-occurring transition 1514 in a first UI 1502, but the rb signal 1228 may be active when transitions 1516, 1518 occur in a second UI 1512, In the example depicted, the transitions 1516, 1518 in the second UI 1512 are masked, and the expected pulse 1510 corresponding to the second UI 1512 is suppressed. In this example, the recovered clock frequency may be half the clock frequency used to transmit symbols on the 3-phase interface.

As illustrated by the examples of FIGS. 14 and 15, the CDR circuit 1200 may be subject to the constraint:

$$t_{skew} < t_{loop} < UI.$$

Empirical evidence suggests that $t_{loop}$ 1320, 1406, 1506 is very sensitive to PVT. $t_{loop}$ 1320 for the CDR circuit 1200 may be restated as:

$$t_{loop} = t_{ck2q} + t_{OR\_1} + t_{rst} + t_{OR\_0} + (t_{pgm} + t_{pgm}).$$

The loop time is susceptible to reliability at higher symbol rates due to the large number of delays that are sensitive to PVT variations, the double $t_{pgm}$ delay and the large delay associated with the 6-input OR gate 1212 can limit the maximum frequency of a clock signal recoverable by the CDR circuit 1200. Increasing the delay provided by the programmable delay circuit 1214 to accommodate the range of potential variations of PVT serves to further limit the maximum frequency of the clock signal recoverable by the CDR circuit 1200.

More recent implementations and proposed specifications for C-PHY, including the C-PHY 1.2 specifications and C-PHY 2.0 specifications, define frequencies of symbol transmission clock signals that can exceed the capabilities of conventional CDR circuits to recover a clock signal at the receiver. The symbol transmission clock signal is used to control the rate of symbol transmission and determines the duration of the UI 1302. The duration of the UI 1302 is reduced when the frequency of the symbol transmission clock signal is increased. Constraints introduced by the loop delay in the CDR circuit 1200 limit the minimum duration of the UI 1302 that can be supported by the CDR circuit 1200, which limits the maximum frequency of the symbol transmission clock signal that can be supported by the CDR circuit 1200. Even using advanced device technology, the loop delay in the CDR circuit 1200 can exceed 300 picoseconds under certain PVT conditions, which can limit conventional C-PHY applications to a maximum symbol transmission rate of 2.5 Gigasymbols per second. In some implementations, the constraint on the duration of the UI 1302 introduced by the loop delay in the CDR circuit 1200 can render the conventional CDR circuit 1200 ineffective for use in C-PHY interfaces that are to conform to later generations of C-PHY specifications.

Figure 16:
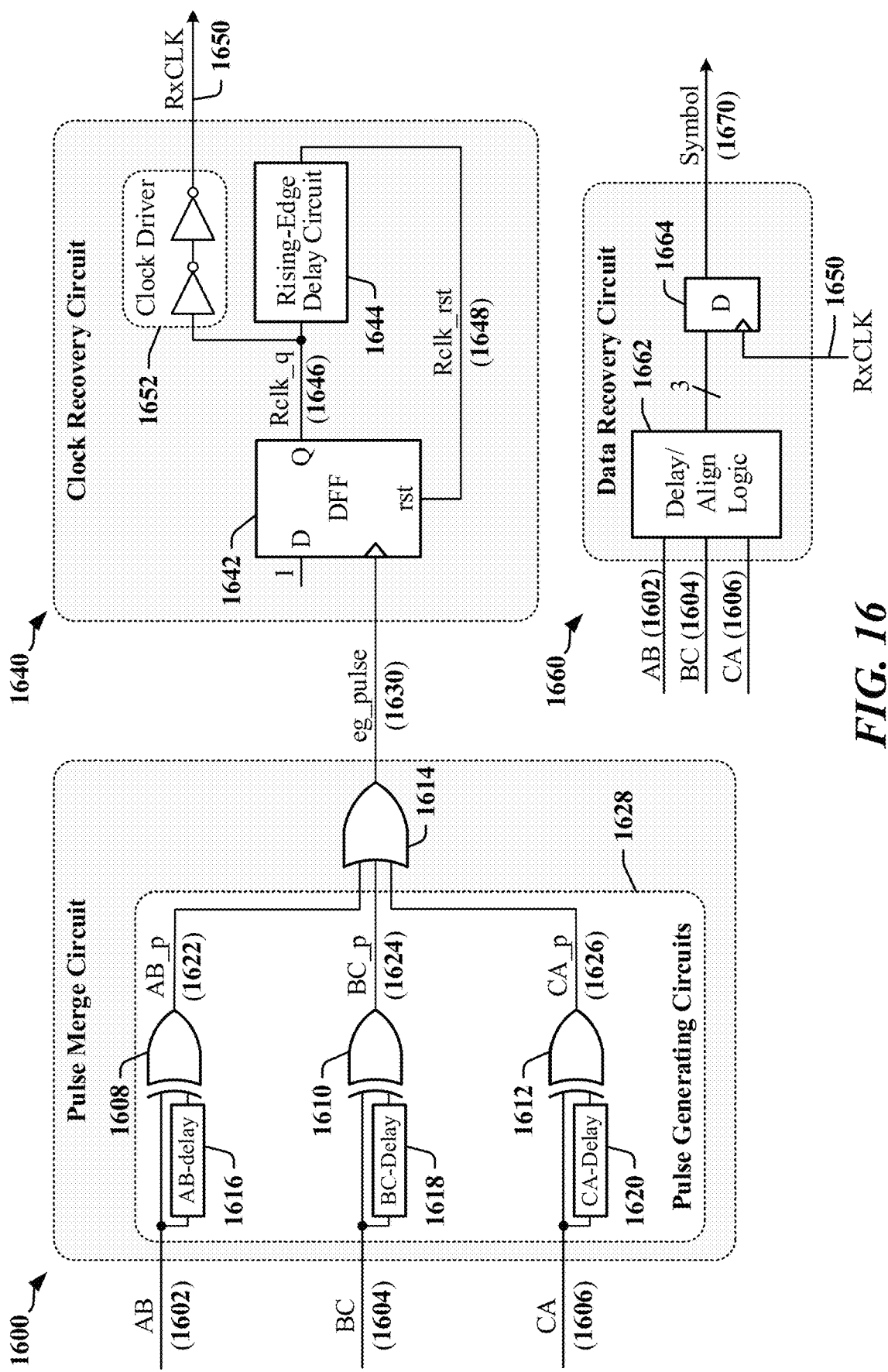
FIG. 16 illustrates a CDR circuit provided in accordance with certain aspects of this disclosure.
Figure 17:
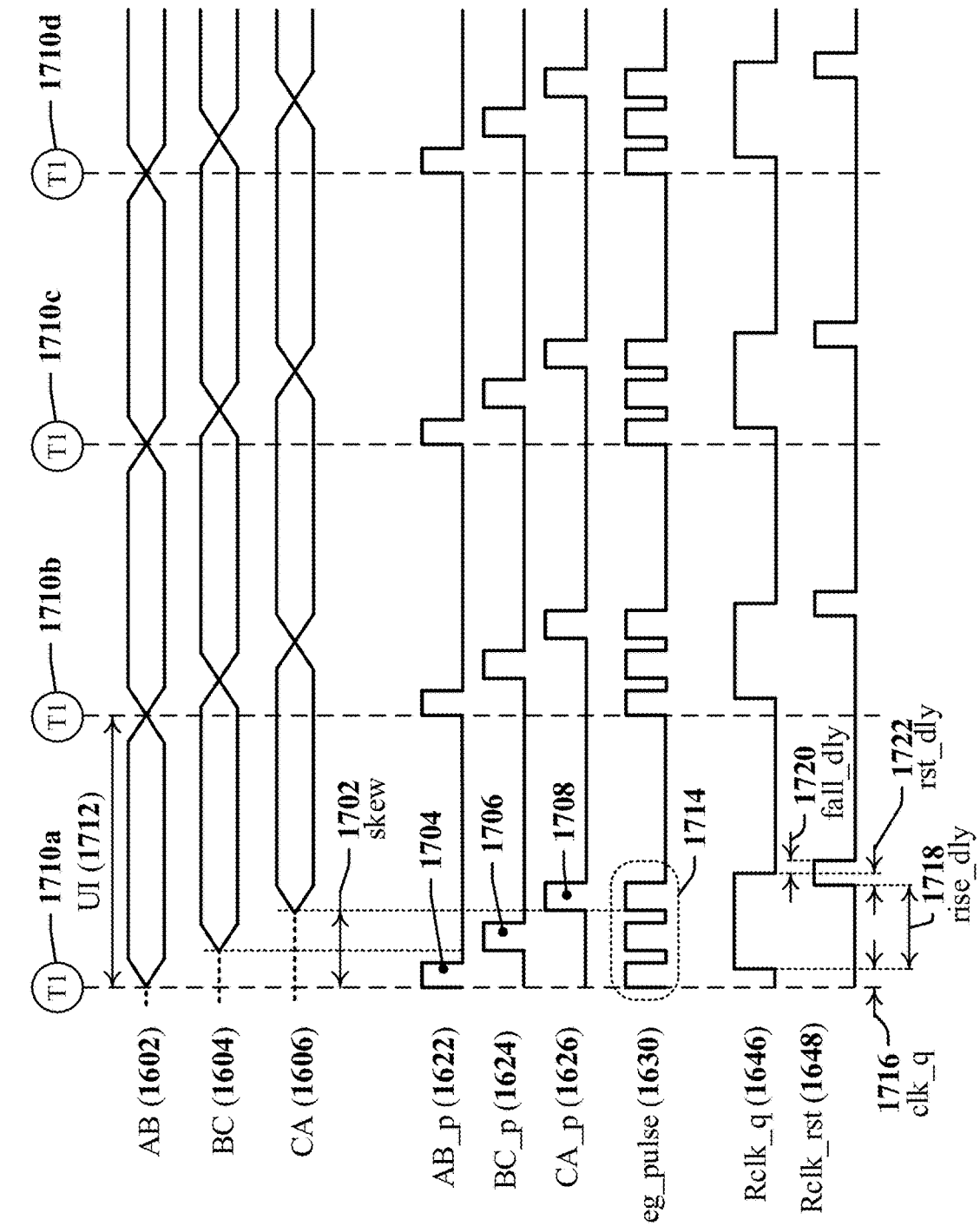
FIG. 17 illustrates timing associated with the CDR circuit illustrated in FIG. 16.

Clock recovery circuits implemented in accordance with certain aspects disclosed herein can support the higher clock frequencies defined by later-generation C-PHY specifications. FIG. 16 provides one example of a clock recovery circuit 1640 that can be configured according to certain aspects of this disclosure to support higher symbol transmission clock frequencies. The clock recovery circuit 1640 uses an optimized feedback loop that minimizes or reduces loop delay and enables the clock recovery circuit 1640 to generate a receive clock signal 1646 at frequencies of at least 8 GHz. The delay loop may be implemented using an asymmetric delay circuit that delays one type of edge and passes the other type of edge with minimal delay. In the illustrated example, the delay loop is implemented using a few logic gates and a PVT insensitive delay block that is responsive only to rising edges. The illustrated clock recovery circuit 1640 can be configured to optimize loop timing and support very fast symbol transmission rates. A pulse generate and merge circuit 1600 generates and merges transition pulses representative of transitions detected in difference signals 1602, 1604, 1606. FIG. 17 is a timing diagram 1700 that illustrates timing associated with the pulse generate and merge circuit 1600 and clock recovery circuit 1640.

The pulse generate and merge circuit 1600 receives the difference signals 1602, 1604, 1606 representative of differences in signaling state of pairs of wires the trio of wires A, B and C. The difference signals 1602, 1604, 1606 may be received from differential receivers or comparators such as differential receivers 802a, 802b and 802c that produce the difference signals 810a, 810b, 810c illustrated in FIG. 8. The pulse generate and merge circuit 1600 uses three exclusive-OR gates 1608, 1610, 1612 and corresponding delay circuits 1616, 1618 and 1620 to generate limited-duration transition pulses 1704, 1706, 1708 in response to transitions occurring in the difference signals 1602, 1604, 1606. In the example of the illustrated timing diagram 1700, a transition in the AB difference signal 1602, the BC difference signal 1604 and the CA difference signal 1606 occurs at each of the illustrated symbol boundaries 1710a, 1710b, 1710c, 1710d. The transitions in the difference signals 1602, 1604, 1606 can occur at different times, such that a skew 1702 can be observed between the first-occurring transition and the last-occurring transition. In the illustrated example, the first-occurring transition is observed on the AB difference signal 1602 and the last-occurring transition is observed on the CA difference signal 1606 at the first illustrated symbol boundary 1710a. The relationship between transitions can be different at each symbol boundary 1710a, 1710b, 1710c, 1710d. In operation, a transition occurs on at least one difference signal 1602, 1604, 1606 at each symbol boundary 1710a, 1710b, 1710c, 1710d and, can occur on fewer than three difference signals 1602, 1604, 1606 at one or more symbol boundaries 1710a, 1710b, 1710c, 1710d.

A first exclusive-OR gate 1608 receives the AB difference signal 1602 and a delayed version of the AB difference signal 1602 provided by the AB-delay circuit 1616, and provides an AB_p signal 1622 that includes a transition pulse 1704 that has a duration controlled by the duration of delay introduced by the AB-delay circuit 1616. A second exclusive-OR gate 1610 receives the BC difference signal 1604 and a delayed version of the BC difference signal 1604 provided by the BC-delay circuit 1618, and provides a BC_p signal 1624 that includes a transition pulse 1706 that has a duration controlled by the duration of delay introduced by the BC-delay circuit 1618. A third exclusive-OR gate 1612 receives the CA difference signal 1606 and a delayed version of the CA difference signal 1606 provided by the CA-delay circuit 1620, and provides a CA_p signal 1626 that includes a transition pulse 1708 that has a duration controlled by the duration of delay introduced by the CA-delay circuit 1620. The AB_p signal 1622, the BC_p signal 1624 and the CA_p signal 1626 are provided to an OR-gate 1614 that provides an eg_pulse signal 1630 that may be referred to herein as a combination signal that includes pulses 1714 derived from and/or corresponding to the transition pulses 1704, 1706, 1708 in the AB_p signal 1622, the BC_p signal 1624 and the CA_p signal 1626. In some instances, two or more of the transition pulses 1704, 1706, 1708 may overlap in time and be merged in the pulses 1714 of the combination signal.

The eg_pulse signal 1630 clocks a delay flipflop (DFF 1642) in the clock recovery circuit 1640. In certain implementations, a different type of flipflop, a latch, a register or other sequential logic circuit may be configured for use as an alternative to a DFF 1642. Each rising edge in the eg_pulse signal 1630 clocks a logic 1 from the D input through to the output (Q) of the DFF 1642. The output of the DFF 1642 provides the receive clock signal 1646 (Rclk_q). The delay circuits 1616, 1618 and 1620 may be configured to provide transition pulses 1704, 1706, 1708 that have a duration sufficient to clock the DFF 1642 under expected or observed PVT conditions. For example, the duration of the transition pulses 1704, 1706, 1708 may be configured based on a minimum duration for a clock pulse. The receive clock signal 1646 transitions high from an initial state in which the receive clock signal 1646 is in a reset state (i.e., set to a logic 0 state). The receive clock signal 1646 transitions high in response to a first rising edge in the eg_pulse signal 1630 and after a delay caused by a gate propagation delay (clk_q 1716), which may correspond to the accumulated transition times of the OR-gate 1614 and DFF 1642. The receive clock signal 1646 transitions high in response to the first rising edge in the eg_pulse signal 1630, and additional edges in the eg_pulse signal 1630 have no effect until the DFF 1642 is reset.

The DFF 1642 is reset when the output (Rclk_rst signal 1648) of a rising-edge delay circuit 1644 transitions high. The rising-edge delay circuit 1644 is configured to pass falling edges at its input with no delay or minimal delay before causing the Rclk_rst signal 1648 to fall, and to delay rising edges at its input before causing the Rclk_rst signal 1648 to rise. In the illustrated example, the rising-edge delay circuit 1644 receives the receive clock signal 1646 as its input and delays rising edges in the receive clock signal 1646 by a selected delay duration (rise_dly 1718). Falling edges in the receive clock signal 1646 are delayed by a duration (fall_dly 1720) that may be attributable to transition times associated with the DFF 1642, and/or one or more logic gates in the rising-edge delay circuit 1644. The rising-edge delay circuit 1644 is one example of the asymmetric delay circuit. One should appreciate that other types of asymmetric delay circuits may be used in various implementations including, for example, a falling-edge delay circuit.

After the Rclk_rst signal 1648 rises, the output of the DFF 1642 is reset and the receive clock signal 1646 returns to logic 0 after a delay (rst_dly 1722) that may be attributable to gate transition times. The falling edge in the receive clock signal 1646 is delayed by the duration of fall_dly 1720 and the clock recovery circuit 1640 is returned to its initial state. In some implementations, the receive clock signal 1646 may be used to capture the difference signals 1602, 1604, 1606 and/or decode data from the difference signals 1602, 1604, 1606. In some implementations, a driver circuit 1652 is provided to buffer and/or delay the receive clock signal 1646, and to provide a clock signal (RxCLK signal 1650) as the output of the clock recovery circuit 1640. The RxCLK signal 1650 may be used to capture the difference signals 1602, 1604, 1606 and/or decode data from the difference signals 1602, 1604, 1606.

In one example, a data recovery circuit 1660 may include one or more latches, registers or flipflops 1664 that receive the RxCLK signal 1650. The latches, registers or flipflops 1664 may be configured to capture the signaling state of the difference signals 1602, 1604, 1606, and to provide a stable output symbol 1670 for each pulse that occurs on the RxCLK signal 1650. Delay or alignment logic 1662 may adjust the timing of the difference signals 1602, 1604, 1606. For example, the delay or alignment logic 1662 may be used to adjust the timing of the difference signals 1602, 1604, 1606 with respect to the pulses on the RxCLK signal 1650 to ensure that the latches, registers or flipflops 1664 capture the signaling state of the difference signals 1602, 1604, 1606 when the difference signals 1602, 1604, 1606 are stable. The delay or alignment logic 1662 may provide relative delays or advances of edges in the difference signals 1602, 1604, 1606.

The maximum frequency of operation of the clock recovery circuit 1640 and the corresponding minimum UI 1712 may be determined by the timing constraints associated with the clock recovery circuit 1640 and the pulse generate and merge circuit 1600. The timing delays in the pulse generate and merge circuit 1600 are external to the timing loop of the clock recovery circuit 1640. The timing constraints may be stated as:

$$clk\_q + rise\_dly > skew, \text{ and}$$

$$clk\_q + rise\_dly + rst\_dly + fall\_dly < 1 UI$$

The clk_q 1716, rst_dly 1722 and fall_dly 1720 parameters are quantifiable as a small number of gating switching delays, and the rise_dly 1718 duration may be selected based on skew time under expected PVT conditions with a small gating switching delay attributable to clk_q 1716.

According to certain aspects disclosed herein, the rising-edge delay circuit 1644 and the delay circuits 1616, 1618 and 1620 may be configured during manufacture, system configuration and/or system initialization. In some implementations the rising-edge delay circuit 1644 and/or each of the delay circuits 1616, 1618 and 1620 are programmable and can be dynamically reconfigured and/or calibrated during bus operation using, for example, initial line synchronization signaling transmitted over the C-PHY bus. The delay circuits 1616, 1618 and 1620 may be calibrated based on measured, observed and/or expected operating conditions. A controller or processor can obtain a desired or required symbol transmission rate by optimizing the duration of rise_dly 1718 and or the delays provided by delay circuits 1616, 1618 and 1620 for PVT conditions.

Figure 18:
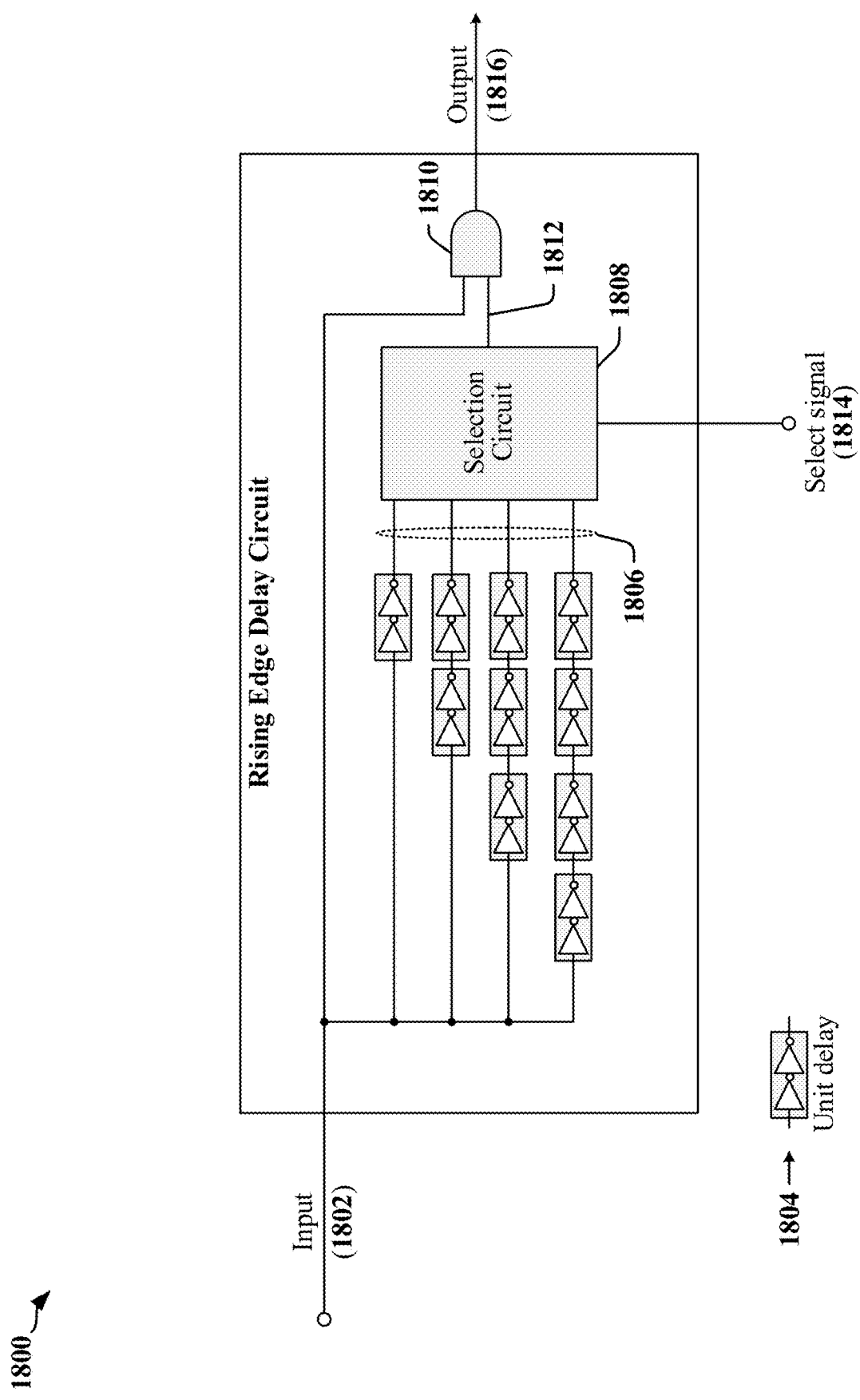
FIG. 18 illustrates an example of a rising-edge delay circuit that may be used in accordance with certain aspects disclosed herein.

FIG. 18 illustrates one example of a rising-edge delay circuit 1800 that may be used to delay rising-edges by a configured or configurable delay duration while passing falling edges without added delay in accordance with certain aspects disclosed herein. Other types of circuit may be employed to delay rising-edges while passing falling edges without added delay. The illustrated rising-edge delay circuit 1800 can be implemented using a set of unit delay elements 1804, where different delay paths 1806 include different numbers of unit delay elements 1804 that are concatenated to obtain selectable delay durations. In some instances, the different delay paths 1806 may be provided using a single multi-tap delay path. A signal received at the input 1802 of the rising-edge delay circuit 1800 is routed through one or more delay paths 1806 under the control of a selection circuit 1808 that selects a signal output by one of the delay paths 1806 to drive the output 1812 of the selection circuit 1808. In one example, the selection circuit 1808 is implemented using a multiplexer. In another example, the selection circuit 1808 is implemented using a set of switches that direct the signal received at the input 1802 to a delay path 1806, or drives the output 1812 of the selection circuit 1808 using a signal that traversed one of the delay paths 1806. The rising-edge delay circuit 1800 may be configured by providing a select signal 1814 to the selection circuit 1808, where the select signal 1814 determines which of the delay paths 1806 drives the output 1812 of the selection circuit 1808.

The output 1812 of the selection circuit 1808 is gated by the input 1802 of the rising-edge delay circuit 1800 using an AND gate 1810. The AND gate 1810 drives the output 1816 of the rising-edge delay circuit 1800. A low logic level at the input 1802 of the rising-edge delay circuit 1800 forces the output 1816 of the rising-edge delay circuit 1800 to a low logic level. A rising edge at the input 1802 of the rising-edge delay circuit 1800 occurs when the input 1802 transitions to the high logic level from the low logic level. When the input 1802 is at a high logic level, the output 1816 of the rising-edge delay circuit 1800 is controlled by the output 1812 of the selection circuit 1808. The output 1812 of the selection circuit 1808 is initially in the low logic state and remains low until a delayed version of the rising edge in the input 1802 of the rising-edge delay circuit 1800 exits the selected delay path 1806 and causes the output 1812 of the selection circuit 1808 to transition high. A falling edge at the input 1802 occurs when the input 1802 transitions to the low logic level from the high logic level. The low logic level at the input 1802 of the rising-edge delay circuit 1800, being coupled to an input of the AND gate 1810, forces the output 1816 of the rising-edge delay circuit 1800 to return to the low logic level.

Other implementations of the of the rising-edge delay circuit 1800 are contemplated. In some implementations, the AND gate 1810 may be omitted when each of the unit delay elements 1804 are implemented as resettable delay elements. In some implementations, each delay element in the rising-edge delay circuit 1800 may be reset by a low logic level on the input 1802 of the rising-edge delay circuit 1800, such that a falling edge is immediately propagated through the delay paths 1806 (with small delays attributable to switching time of one or more logic gates), whereas rising edges are propagated from delay element to delay element in each delay path 1806. In another example the type of selection circuit 1808 may be configured to obtain an additional or minimum delay.

Examples of Processing Circuits and Methods

Figure 19:
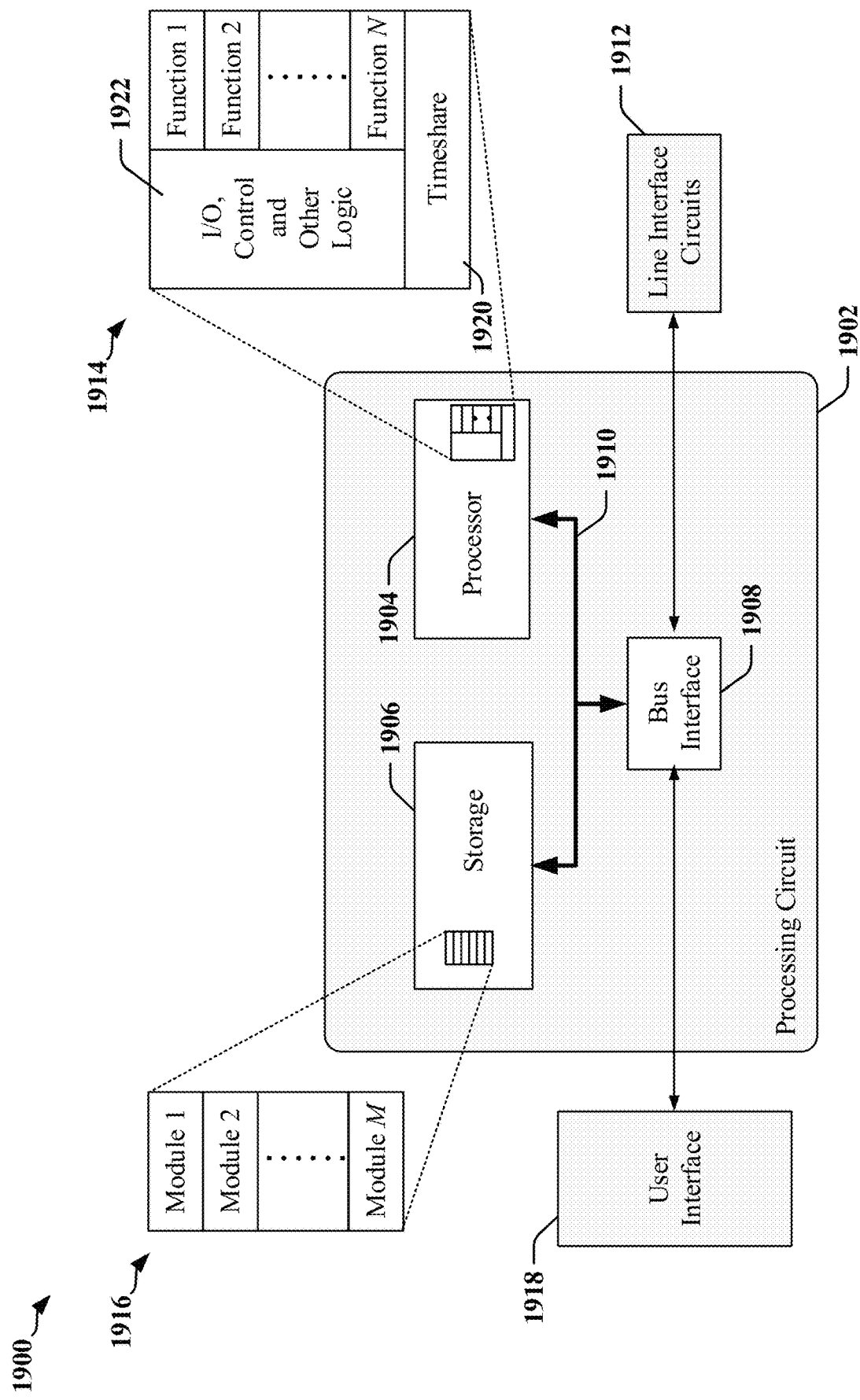
FIG. 19 is a block diagram illustrating an example of an apparatus employing a processing circuit that may be adapted according to certain aspects disclosed herein.

FIG. 19 illustrates an example of a hardware implementation for an apparatus 1900 employing a processing circuit 1902 that may be configured to perform one or more functions disclosed herein. In accordance with various aspects of the disclosure, an element, or any portion of an element, or any combination of elements as disclosed herein may be implemented using the processing circuit 1902. The processing circuit 1902 may include certain devices, circuits, and/or logic that support clock recovery techniques disclosed herein.

The processing circuit 1902 may include one or more processors 1904 that are controlled by some combination of hardware and software modules. Examples of processors 1904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. In one example, the bus 1910 links together various circuits including the one or more processors 1904 and a processor-readable storage medium 1906. The processor-readable storage medium 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912. A transceiver 1912 may be provided for each networking technology supported by the processing circuit. In some instances, multiple networking technologies may share some or all of the circuitry or processing modules found in a transceiver 1912. Each transceiver 1912 provides a means for communicating with various other apparatus over a transmission medium. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium, which may include the processor-readable storage medium 1906. In this respect, the processing circuit 1902, including the processor 1904, may be used to implement any of the methods, functions and techniques disclosed herein. The processor-readable storage medium 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 1906 or in another external processor-readable medium. The processor-readable storage medium 1906 may include a non-transitory computer-readable storage medium and/or a transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 1906 may also include, by way of example, a carrier wave, a transmission line, and any other suitable medium for transmitting software and/or instructions that may be accessed and read by a computer. The processor-readable storage medium 1906 may reside in the processing circuit 1902, in the processor 1904, external to the processing circuit 1902, or be distributed across multiple entities including the processing circuit 1902. The processor-readable storage medium 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processor-readable storage medium 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as the transceiver 1912, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to the transceiver 1912, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

The apparatus 1900 may be adapted, configured and/or operated in accordance with certain aspects of this disclosure. In a first implementation, the resulting clock recovery apparatus may include a plurality of pulse generating circuits 1628 (see FIG. 16), where each pulse generating circuit is configured to generate a transition pulse in response to a transition in a difference signal representative of a difference in signaling state of a pair of wires in a three-wire bus. In the first implementation, the clock recovery apparatus may include a first logic circuit configured to provide a combination signal that includes pulses that correspond to transition pulses received from the plurality of pulse generating circuits 1628, and a second logic circuit responsive to pulses in the combination signal and configured to output a clock signal used for decoding information from transitions in signaling state of the three-wire bus, where the pulses in the combination signal cause the clock signal to be driven to a first state. The second logic circuit may be implemented using a flipflop (such as a delay flipflop), a latch, a register or other sequential logic circuit. In the first implementation, the clock recovery apparatus may include an asymmetric delay circuit configured to generate a reset signal from the clock signal, where the reset signal is generated by delaying transitions to the first state while passing transitions from the first state without added delay, and where the clock signal is driven from the first state after a transition of the clock signal to the first state is passed by the asymmetric delay circuit.

In a second implementation, each of the plurality of pulse generating circuits 1628 of the clock recovery apparatus of the first implementation includes an exclusive OR-gate configured to receive an associated difference signal and a delayed version of the associated difference signal as inputs. In a third implementation, the first logic circuit of the second implementation includes a logic gate configured to provide the combination signal by combining output signals received from the exclusive OR-gate in each pulse generating circuit. In a fourth implementation, each of the plurality of pulse generating circuits 1628 of the second implementation or the third implementation is configured to generate transition pulses with a duration configured based on a minimum clock pulse duration defined for the second logic circuit. In a fifth implementation, duration of pulses generated by each of the plurality of pulse generating circuits 1628 of the second implementation, the third implementation or the fourth implementation is configurable.

In a sixth implementation, a duration of a delay applied by the asymmetric delay circuit of the first implementation, the second implementation, the third implementation, the fourth implementation or the fifth implementation to transitions to the first state is configurable. In a seventh implementation, the asymmetric delay circuit of the first implementation, the second implementation, the third implementation, the fourth implementation, the fifth implementation or the sixth implementation includes a rising-edge delay circuit configured to delay transitions from a low logic state to a high logic state, and further configured to pass transitions from the high logic state to the low logic state without added delay. In an eighth implementation, the clock recovery apparatus of the first implementation, the second implementation, the third implementation, the fourth implementation, the fifth implementation, the sixth implementation or the seventh implementation includes a wire state decoder configured to decode symbols from transitions in signaling state of the three-wire bus based on timing information provided in the clock signal.

The processing circuit 1902 may be configured to perform at least some part of the methods disclosed herein. In a first example, a clock recovery method includes generating a combination signal that includes pulses that correspond to transition pulses generated in response to a transition in a difference signal representative of a difference in signaling state of a pair of wires in a three-wire bus; providing the combination signal to a logic circuit that is configured to provide a clock signal as its output, where pulses in the combination signal cause the clock signal to be driven to a first state; and providing a reset signal to the logic circuit, where the reset signal is derived from the clock signal by delaying transitions to the first state while passing transitions from the first state without added delay, and where the clock signal is driven from the first state after a transition of the clock signal to the first state is passed by the asymmetric delay circuit. The logic circuit may be implemented using a flipflop (such as a delay flipflop), a latch, a register or other sequential logic circuit.

In a second example, the clock recovery method of the first example includes generating a transition pulse for a first difference signal by performing an exclusive OR-gate function on the first difference signal and a delayed version of the first difference signal. In a third example, the clock recovery method of the first example or the second example includes configuring at least one pulse generating circuit to provide corresponding transition pulses with a duration based on a minimum clock pulse duration defined for the logic circuit. In a fourth example, the clock recovery method of the first example, the second example or the third example includes calibrating at least one pulse generating circuit based on operating conditions of the three-wire bus. In a fifth example, the clock recovery method of the first example, the second example, the third example or the fourth example includes configuring an asymmetric delay circuit to select a duration of a delay applied to transitions to the first state. In a sixth example, the asymmetric delay circuit of the first example, the second example, the third example, the fourth example or the fifth example includes a rising-edge delay circuit configured to delay transitions from a low logic state to a high logic state, and is further configured to pass transitions from the high logic state to the low logic state without added delay. In a seventh example, the clock recovery method of the first example, the second example, the third example, the fourth example, the fifth example or the sixth example includes providing the clock signal to a wire state decoder configured to decode symbols from transitions in signaling state of the three-wire bus based on timing information provided in the clock signal.

Figure 20:
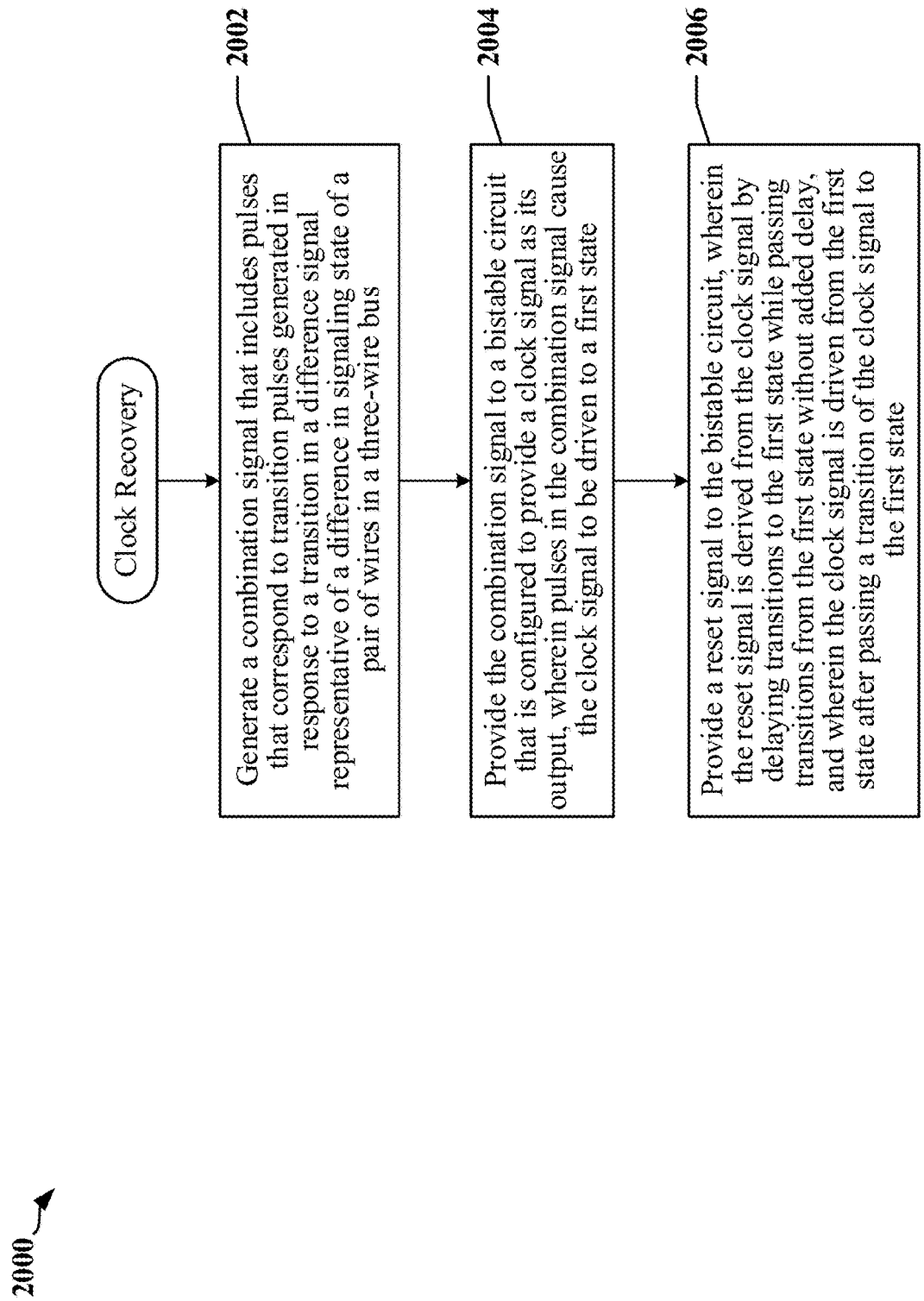
FIG. 20 is a flowchart of a first method of calibration according to certain aspects disclosed herein.

FIG. 20 is a flowchart 2000 of a clock recovery method that may be implemented at a receiving device coupled to a 3-wire C-PHY interface. At block 2002, the receiving device may generate a combination signal that includes pulses that correspond to transition pulses generated in response to a transition in a difference signal representative of a difference in signaling state of a pair of wires in a three-wire bus. At block 2004, the receiving device may provide the combination signal to a logic circuit that is configured to provide a clock signal as its output. The logic circuit may be implemented using a flipflop (such as a delay flipflop), a latch, a register or other sequential logic circuit. The pulses in the combination signal cause the clock signal to be driven to a first state. At block 2006, the receiving device may provide a reset signal to the logic circuit. The reset signal is derived from the clock signal by delaying transitions to the first state while passing transitions from the first state without added delay. The clock signal is driven from the first state after passing a transition of the clock signal to the first state.

The receiving device may generate a transition pulse for a first difference signal by performing an exclusive OR-gate function on the first difference signal and a delayed version of the first difference signal. The receiving device may configure at least one pulse generating circuit to provide corresponding transition pulses with a duration based on a minimum clock pulse duration defined for the logic circuit. The receiving device may calibrate at least one pulse generating circuit based on operating conditions of the three-wire bus. The receiving device may configure an asymmetric delay to provide a desired duration of delay applied to transitions to the first state. In one example, the asymmetric delay circuit is implemented as a rising-edge delay circuit configured to delay transitions from a low logic state to a high logic state. The rising-edge delay circuit may be further configured to pass transitions from the high logic state to the low logic state without added delay.

In various implementations, the clock signal may be provided to a wire state decoder configured to decode symbols from transitions in signaling state of the three-wire bus based on timing information provided in the clock signal.

Figure 21:
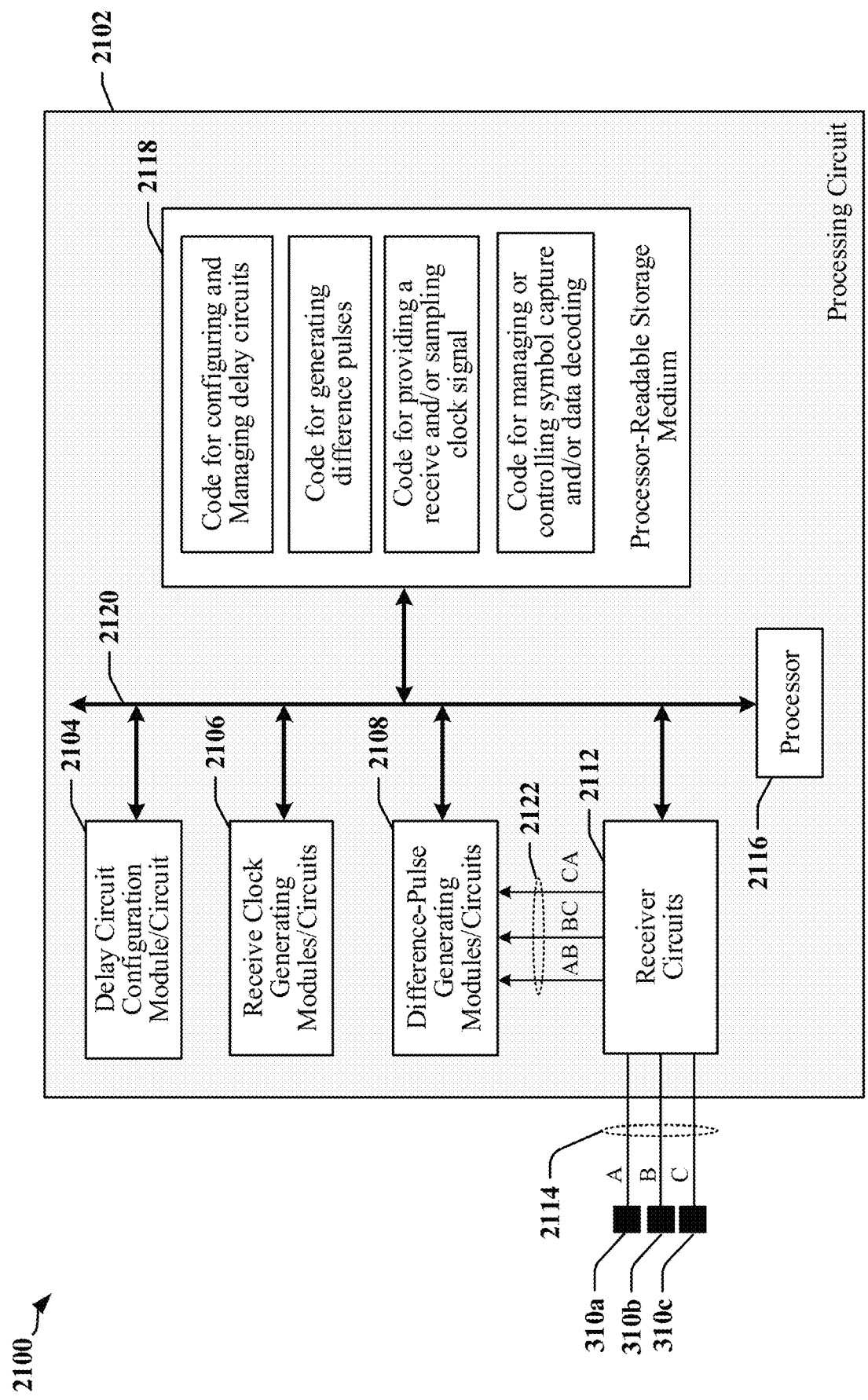
FIG. 21 is a diagram illustrating a first example of a hardware implementation for an apparatus employing a processing employing a processing circuit adapted according to certain aspects disclosed herein.

FIG. 21 is a diagram illustrating an example of a hardware implementation for an apparatus 2100 employing a processing circuit 2102. The processing circuit 2102 typically has at least one processor 2116 that may include one or more of a microprocessor, microcontroller, digital signal processor, a sequencer and a state machine. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the processor 2116, the modules or circuits 2104, 2106 and 2108, difference receiver circuits 2112 that generate difference signals 2122 representative of differences in signaling state between different pairs of the connectors or wires 2114 and the processor-readable storage medium 2118. The bus 2120 may also link various other circuits such as timing sources, peripherals, voltage regulators, and power management circuits, which are well known in the art, and therefore, will not be described any further.

The processor 2116 is responsible for general processing, including the execution of software stored on the processor-readable storage medium 2118. The software, when executed by the processor 2116, causes the processing circuit 2102 to perform the various functions described supra for any particular apparatus. The processor-readable storage medium 2118 may also be used for storing data that is manipulated by the processor 2116 when executing software, including data decoded from symbols transmitted over the connectors or wires 2114, which may be configured as a C-PHY bus. The processing circuit 2102 further includes at least one of the modules 2104, 2106 and 2108. The modules 2104, 2106 and 2108 may be software modules running in the processor 2116, resident/stored in the processor-readable storage medium 2118, one or more hardware modules coupled to the processor 2116, or some combination thereof. The modules 2104, 2106 and/or 2108 may include microcontroller instructions, state machine configuration parameters, or some combination thereof.

In one configuration, the apparatus 2100 may be configured for data communication in accordance with a C-PHY interface protocol. The apparatus 2100 may include modules and/or circuits 2108 configured to generate transition pulses in response to transitions in signaling state of the difference signals 2122, modules and/or circuits 2106 that are configured to generate a clock signal useable to decode symbols from transitions in signaling state of the three-wire bus, and configuration modules and/or circuits 2104 for configuring delay durations used in generating the transition pulses and/or receive clock.

In one example, the apparatus 2100 has a plurality of pulse generating circuits 1628 (see FIG. 16), one or more combinational logic circuits and a clock recovery circuit. Each of the pulse generating circuits 1628 is configured to generate a transition pulse in response to a transition in a difference signal 2122 that is representative of a difference in signaling state of a pair of wires in a three-wire bus. One combinational logic circuit is configured to provide a combination signal that includes pulses that correspond to transition pulses received from the plurality of pulse generating circuits 1628. In one example, three difference signals 2122 are combined using a logic-OR gate such that a high logic level of a transition pulse in any difference signal 2122 causes a high logic level in the combination signal, where the state of the combination signal returns to a low logic level when the three difference signals 2122 are at a low logic level. The clock recovery circuit may be implemented using a flipflop (such as a delay flipflop), a latch, a register or other sequential logic circuit. The clock recovery circuit may respond to pulses in the combination signal and is configured to output a clock signal used for decoding information from transitions in signaling state of the three-wire bus. The pulses in the combination signal cause the clock signal to be driven to a first state. The clock recovery circuit may include an asymmetric delay circuit that is configured to generate a reset signal from the clock signal. The reset signal is generated by delaying transitions to the first state while passing transitions from the first state without added delay. The clock signal is driven from the first state after a transition of the clock signal to the first state is passed by the asymmetric delay circuit.

Each pulse generating circuit includes an exclusive OR-gate configured to receive the associated difference signal and a delayed version of the associated difference signal as inputs. A combinational logic circuit may include a logic gate configured to provide the combination signal by combining output signals received from the exclusive OR-gate of each pulse generating circuit. Each pulse generating circuit is configured to generate pulses with a duration configured based on a minimum clock pulse duration defined for the clock recovery circuit. The duration of pulses generated by the delay circuit 1616, 1618, 1620 in each of the plurality of pulse generating circuits 1628 may be configurable. The duration of the delay applied by the asymmetric delay circuit to transitions to the first state may be configurable.

In one example, the asymmetric delay circuit is implemented as a rising-edge delay circuit configured to delay transitions from a low logic state to a high logic state, and further configured to pass transitions from the high logic state to the low logic state without added delay. In one example, the apparatus 2100 includes a wire state decoder configured to decode symbols from transitions in signaling state of the three-wire bus based on timing information provided in the clock signal.

The processor-readable storage medium 2118 may be a non-transitory storage medium and may store instructions and/or code that, when executed a processor 2116, cause the processing circuit 2102 to generate a combination signal that includes one or more transition pulses, where each transition pulse is generated responsive to a transition in a difference signal 2122 representative of a difference in signaling state of a pair of wires in the three-wire bus. The instructions and/or code cause the processing circuit 2102 to provide the combination signal to a logic circuit that is configured to provide a clock signal as its output, where pulses in the combination signal cause the clock signal to be driven to a first state. The logic circuit may be implemented using a flipflop (such as a delay flipflop), a latch, a register or other sequential logic circuit. The instructions and/or code cause the processing circuit 2102 to provide a reset signal to the logic circuit, where the reset signal is derived from the clock signal by delaying transitions to the first state while passing transitions from the first state without added delay. The clock signal is driven from the first state after passing a transition of the clock signal to the first state.

The instructions and/or code may cause the processing circuit 2102 to generate a transition pulse for a first difference signal by performing an exclusive OR-gate function on the first difference signal and a delayed version of the first difference signal. The instructions and/or code may cause the processing circuit 2102 to configure at least one pulse generating circuit to provide corresponding transition pulses with a duration based on a minimum clock pulse duration defined for the logic circuit. The instructions and/or code may cause the processing circuit 2102 to calibrate at least one pulse generating circuit based on operating conditions of the three-wire bus. The instructions and/or code may cause the processing circuit 2102 to configure an asymmetric delay circuit to provide a desired duration of delay applied to transitions to the first state. The asymmetric delay circuit may be implemented using a rising-edge delay circuit configured to delay transitions from a low logic state to a high logic state, and further configured to pass transitions from the high logic state to the low logic state without added delay. The instructions and/or code may cause the processing circuit 2102 to provide the clock signal to a wire state decoder configured to decode symbols from transitions in signaling state of the three-wire bus based on timing information provided in the clock signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A clock recovery apparatus comprising:
    a plurality of pulse generating circuits, wherein each pulse generating circuit is configured to generate a transition pulse in response to a transition in a difference signal representative of a difference in signaling state of a pair of wires in a three-wire bus;
    a first logic circuit configured to provide a combination signal that includes pulses that correspond to transition pulses received from the plurality of pulse generating circuits;
    a second logic circuit responsive to pulses in the combination signal and configured to output a clock signal used for decoding information from the three-wire bus, wherein the pulses in the combination signal cause the clock signal to be driven to a first state; and
    an asymmetric delay circuit configured to generate a reset signal from the clock signal, wherein the reset signal is generated by delaying transitions of the clock signal to the first state while passing transitions of the clock signal from the first state without added delay, and wherein the clock signal is driven from the first state after a transition of the clock signal to the first state is passed by the asymmetric delay circuit.

2. The clock recovery apparatus of claim 1, wherein each of the plurality of pulse generating circuits comprises:
    an exclusive OR-gate configured to receive an associated difference signal and a delayed version of the associated difference signal as inputs.

3. The clock recovery apparatus of claim 2, wherein the first logic circuit comprises:
    a logic gate configured to provide the combination signal by combining output signals received from the exclusive OR-gate in each pulse generating circuit.

4. The clock recovery apparatus of claim 2, wherein each of the plurality of pulse generating circuits is configured to generate transition pulses with a duration configured based on a minimum clock pulse duration defined for the second logic circuit.

5. The clock recovery apparatus of claim 2, wherein duration of pulses generated by each of the plurality of pulse generating circuits is configurable.

6. The clock recovery apparatus of claim 1, wherein a duration of a delay applied by the asymmetric delay circuit to transitions to the first state is configurable.

7. The clock recovery apparatus of claim 1, wherein the asymmetric delay circuit comprises a rising-edge delay circuit configured to delay transitions from a low logic state to a high logic state, and further configured to pass transitions from the high logic state to the low logic state without added delay.

8. The clock recovery apparatus of claim 1, further comprising:
    a wire state decoder configured to decode symbols from transitions in signaling state of the three-wire bus based on timing information provided in the clock signal.

9. A clock recovery method comprising:
    generating a combination signal that includes pulses that correspond to transition pulses generated in response to a transition in a difference signal representative of a difference in signaling state of a pair of wires in a three-wire bus;
    providing the combination signal to a logic circuit that is configured to provide a clock signal as its output, wherein pulses in the combination signal cause the clock signal to be driven to a first state; and providing a reset signal to the logic circuit, wherein the reset signal is derived from the clock signal by delaying transitions of the clock signal to the first state while passing transitions of the clock signal from the first state without added delay, and wherein the clock signal is driven from the first state after passing a transition of the clock signal to the first state.

10. The clock recovery method of claim 9, further comprising:

generating a transition pulse for a first difference signal by performing an exclusive OR-gate function on the first difference signal and a delayed version of the first difference signal.

11. The clock recovery method of claim 9, further comprising:

configuring at least one pulse generating circuit to provide corresponding transition pulses with a duration based on a minimum clock pulse duration defined for the logic circuit.

12. The clock recovery method of claim 9, further comprising:

calibrating at least one pulse generating circuit based on operating conditions of the three-wire bus.

13. The clock recovery method of claim 9, further comprising:

configuring an asymmetric delay circuit to select a duration of a delay applied to transitions to the first state.

14. The clock recovery method of claim 13, wherein the asymmetric delay circuit comprises a rising-edge delay circuit configured to delay transitions from a low logic state to a high logic state, and further configured to pass transitions from the high logic state to the low logic state without added delay.

15. The clock recovery method of claim 9, further comprising:

providing the clock signal to a wire state decoder configured to decode symbols from transitions in signaling state of the three-wire bus based on timing information provided in the clock signal.

16. A non-transitory processor-readable storage medium having one or more instructions which, when executed by at least one processor of a processing circuit in a receiver, cause the at least one processor to:

generate a combination signal that includes pulses that correspond to transition pulses generated in response to a transition in a difference signal representative of a difference in signaling state of a pair of wires in a three-wire bus;

provide the combination signal to a logic circuit that is configured to provide a clock signal as its output, wherein pulses in the combination signal cause the clock signal to be driven to a first state; and provide a reset signal to the logic circuit, wherein the reset signal is derived from the clock signal by delaying transitions of the clock signal to the first state while passing transitions of the clock signal from the first state without added delay, and wherein the clock signal is driven from the first state after passing a transition of the clock signal to the first state.

17. The storage medium of claim 16, further comprising instructions that cause the at least one processor to:

generate a transition pulse for a first difference signal by performing an exclusive OR-gate function on the first difference signal and a delayed version of the first difference signal.

18. The storage medium of claim 16, further comprising instructions that cause the at least one processor to:

configure at least one pulse generating circuit to provide corresponding transition pulses with a duration based on a minimum clock pulse duration defined for the logic circuit.

19. The storage medium of claim 16, further comprising instructions that cause the at least one processor to:

calibrate at least one pulse generating circuit based on operating conditions of the three-wire bus.

20. The storage medium of claim 16, further comprising instructions that cause the at least one processor to:

configure an asymmetric delay circuit to select a duration of a delay applied to transitions to the first state.

21. The storage medium of claim 20, wherein the asymmetric delay circuit comprises a rising-edge delay circuit configured to delay transitions from a low logic state to a high logic state, and further configured to pass transitions from the high logic state to the low logic state without added delay.

22. The storage medium of claim 16, further comprising instructions that cause the at least one processor to:

provide the clock signal to a wire state decoder configured to decode symbols from transitions in signaling state of the three-wire bus based on timing information provided in the clock signal.

23. A clock recovery apparatus comprising:

means for generating a combination signal that includes pulses that correspond to transition pulses generated in response to a transition in a difference signal representative of a difference in signaling state of a pair of wires in a three-wire bus;

means for providing a clock signal including a logic circuit responsive to pulses in the combination signal, wherein the pulses in the combination signal cause the clock signal to be driven to a first state; and means for providing a reset signal to the logic circuit, wherein the reset signal is derived from the clock signal by delaying transitions of the clock signal to the first state while passing transitions of the clock signal from the first state without added delay, and wherein the clock signal is driven from the first state after passing a transition of the clock signal to the first state.

24. The clock recovery apparatus of claim 23, further comprising:

means for generating the one or more transition pulses, each transition pulse being generated using a corresponding difference signal and a delayed version of the corresponding difference signal.

25. The clock recovery apparatus of claim 23, wherein at least one pulse generating circuit is configured to provide corresponding transition pulses with a duration based on a minimum clock pulse duration defined for the logic circuit.

26. The clock recovery apparatus of claim 23, wherein one or more pulse generating circuits are calibrated based on operating conditions of the three-wire bus.

27. The clock recovery apparatus of claim 23, wherein the means for providing the reset signal is configurable to select a duration of a delay applied to transitions to the first state.

28. The clock recovery apparatus of claim 27, wherein the means for providing the reset signal comprises a rising-edge delay circuit configured to delay transitions from a low logic state to a high logic state, and further configured to pass transitions from the high logic state to the low logic state without added delay.

29. The clock recovery apparatus of claim 23, wherein the clock signal is provided to a wire state decoder configured to decode symbols from transitions in signaling state of the three-wire bus based on timing information provided in the clock signal.

* * * * *